United States Patent
Sumiyoshi et al.

(10) Patent No.: US 8,599,125 B2
(45) Date of Patent: Dec. 3, 2013

(54) LIQUID CRYSTAL DISPLAY DEVICE, BACKLIGHT USED FOR SAME DISPLAY DEVICE, METHOD FOR DRIVING SAME BACKLIGHT AND METHOD FOR MANUFACTURING SAME BACKLIGHT

(75) Inventors: Ken Sumiyoshi, Tokyo (JP); Toshihiro Yoshioka, Tokyo (JP); Hiroshi Hayama, Tokyo (JP); Jin Matsushima, Tokyo (JP)

(73) Assignee: Getner Foundation LLC, Dover, DE (US)

( * ) Notice: Subject to any disclaimer, the term of this patent is extended or adjusted under 35 U.S.C. 154(b) by 662 days.

(21) Appl. No.: 12/381,737

(22) Filed: Mar. 16, 2009

(65) Prior Publication Data
US 2009/0251641 A1   Oct. 8, 2009

Related U.S. Application Data

(62) Division of application No. 11/272,663, filed on Nov. 14, 2005, now Pat. No. 7,598,939, which is a division of application No. 10/279,211, filed on Oct. 23, 2002, now abandoned.

(30) Foreign Application Priority Data

Oct. 23, 2001   (JP) .................................. 2001-324873

(51) Int. Cl.
*G09G 3/36*   (2006.01)
(52) U.S. Cl.
USPC ............................................ 345/102; 345/88
(58) Field of Classification Search
USPC ........... 345/87–100, 102, 204; 349/61, 70, 71
See application file for complete search history.

(56) References Cited

U.S. PATENT DOCUMENTS

| | | | |
|---|---|---|---|
| 5,142,388 A | | 8/1992 | Watanabe et al. |
| 5,402,143 A | * | 3/1995 | Ge et al. ...................... 345/102 |
| 5,428,366 A | | 6/1995 | Eichenlaub |
| 5,461,397 A | | 10/1995 | Zhang et al. |
| 5,592,193 A | * | 1/1997 | Chen .......................... 345/102 |

(Continued)

FOREIGN PATENT DOCUMENTS

| | | |
|---|---|---|
| JP | 62194227 | 8/1987 |
| JP | 299922 | 4/1990 |

(Continued)

OTHER PUBLICATIONS

Taira, et al., "First Response Liquid Crystal Display", AM-LCD, pp. 113-116 (1998).

*Primary Examiner* — Regina Liang
(74) *Attorney, Agent, or Firm* — Turocy & Watson, LLP

(57) ABSTRACT

A Liquid Crystal Display (LCD), a backlight used for the LCD and a method for producing the LCD and the backlight are provided which are capable of inhibiting an increase in component counts and in assembling processes and of reducing them, thereby achieving low costs. A display image is obtained by arranging a backlight section being able to perform scanning as a single unit in a manner that it positionally matches a liquid crystal displaying section. The backlight section is provided with a plurality of scanning electrodes and light emitting layers each providing a different luminescent color, and being spatially separated from each other on a principal face of the backlight and scanning is performed on a plurality of light emitting layers providing a different luminescent color.

37 Claims, 17 Drawing Sheets

(56) References Cited

U.S. PATENT DOCUMENTS

| | | |
|---|---|---|
| 5,796,382 A | 8/1998 | Beeteson |
| 5,854,662 A | 12/1998 | Yuyama et al. |
| 6,144,164 A | 11/2000 | Ito |
| 6,331,064 B1 * | 12/2001 | Nishiyama et al. ............ 349/71 |
| 6,509,701 B1 | 1/2003 | Rakhimov et al. |
| 6,642,913 B1 | 11/2003 | Kimura et al. |
| 6,831,627 B2 * | 12/2004 | Hasegawa et al. ............ 345/102 |
| 6,853,124 B1 | 2/2005 | Vollkommer et al. |
| 6,917,354 B2 | 7/2005 | Fujishiro et al. |
| 2002/0001050 A1 * | 1/2002 | Pope ............................... 349/65 |
| 2002/0067332 A1 * | 6/2002 | Hirakata et al. ............ 345/102 |

FOREIGN PATENT DOCUMENTS

| | | |
|---|---|---|
| JP | 2275984 | 11/1990 |
| JP | 627325 | 2/1994 |
| JP | 7121138 | 5/1995 |
| JP | 9105918 | 4/1997 |
| JP | 9258227 | 10/1997 |
| JP | 1010997 | 1/1998 |
| JP | 10148829 | 6/1998 |
| JP | 11337938 | 12/1999 |
| JP | 2000111871 | 4/2000 |
| JP | 2000180825 | 6/2000 |
| JP | 2000187449 | 7/2000 |

* cited by examiner

FIG. 7A
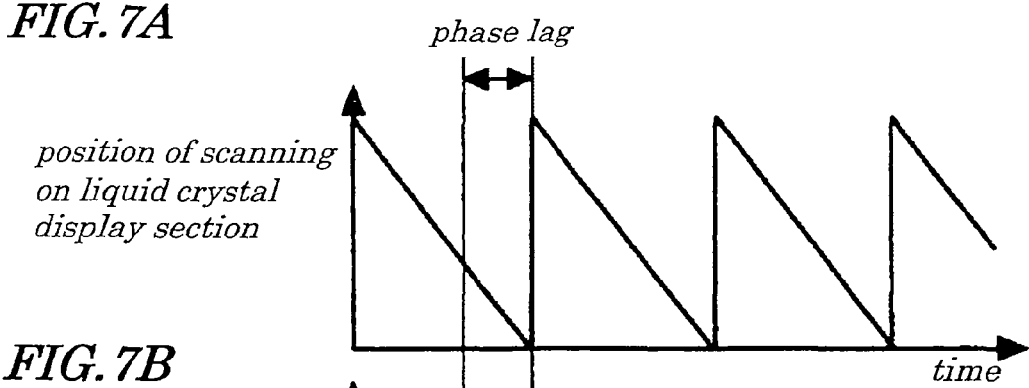
position of scanning on liquid crystal display section
FIG. 7B
position of scanning on backlight section ①
FIG. 7C
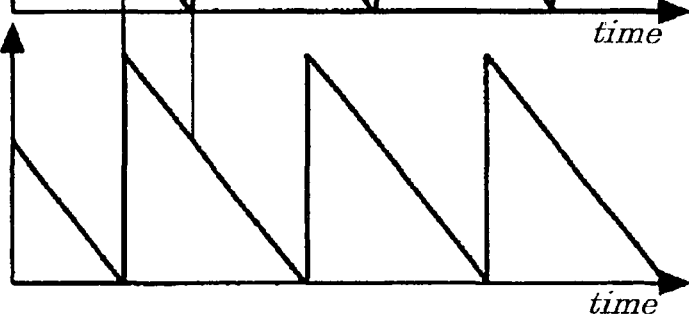
position of scanning on backlight section ②
FIG. 8
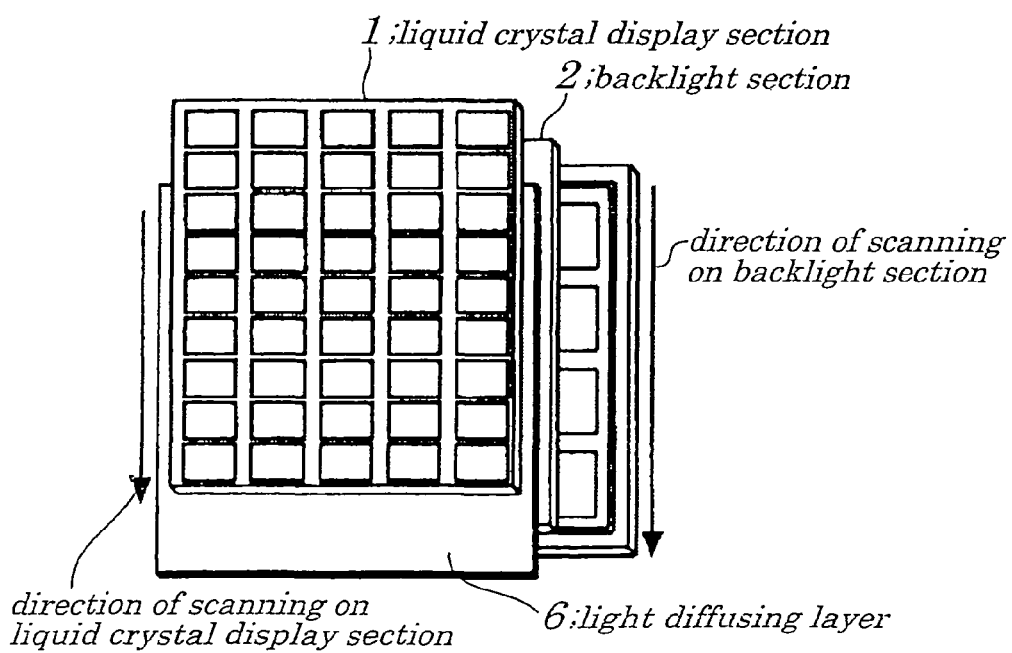
1: liquid crystal display section
2: backlight section
direction of scanning on backlight section
direction of scanning on liquid crystal display section
6: light diffusing layer ◄─► n+1 fluorescent region of scanning electrode

LIQUID CRYSTAL DISPLAY DEVICE, BACKLIGHT USED FOR SAME DISPLAY DEVICE, METHOD FOR DRIVING SAME BACKLIGHT AND METHOD FOR MANUFACTURING SAME BACKLIGHT

CROSS REFERENCE TO RELATED APPLICATIONS

This application is a divisional of U.S. patent application Ser. No. 11/272,663 filed Nov. 14, 2005 (now U.S. Pat. No. 7,598,939), which is a divisional of Ser. No. 10/279,211 filed Oct. 23, 2002 (abandoned), which are both incorporated herein by reference.

BACKGROUND OF THE INVENTION

1. Field of the Invention

The present invention relates to a liquid crystal display device, a backlight used for a same display device, a method for driving a same backlight and a method for manufacturing a same backlight.

The present application claims priorities of Japanese Patent Application No. 2001-324873 filed on Oct. 23, 2001, which are hereby incorporated by reference.

2. Description of the Related Art

In recent years, a remarkable improvement in performance of a liquid crystal display device (hereinafter being referred to an "LCD") is yielded and also a remarkable progress in making its screen larger is made.

The LCD having a large screen is used as a monitor for a personal computer or a like. Development work of a liquid crystal television by expanding technology of the LCD with a large screen is actively proceeding.

In such an application to the television, an improvement in performance of displaying a moving picture in an LCD is strongly required. There are two main reasons for dissatisfactory performance of a conventional LCD.

The first reason is that a response speed in the LCD is low. The second reason is that display using the LCD is performed by using illuminating light being applied constantly. Hereinafter, the second reason is described in detail. In ordinary cases, in a CRT (Cathode Ray Tube) which performs display of moving pictures, a movie or a like, period of non-display is provided between displaying time or a screen and for a subsequent screen.

In the CRT, an image screen is produced by scanning using an electron beam on a fluorescent material. As a result, fluorescent light for a pixel disappears after being scanned and does not appear until a subsequent screen scanning period starts.

Moreover, in the case of a movie, due to a period required for feeding a film existing between displaying time for a screen and a subsequent screen, illuminating light is intercepted, in ordinary cases, during this period.

On the other hand, in the case of the LCD, since light fed from a backlight is applied constantly, a non-display period between displaying time for a screen and for a subsequent screen does not exist. Therefore, even if a moving picture is displayed using the LCD, the moving pictures look like as if they shake.

To solve this problem, a method is proposed in which light to be fed from the backlight is applied in synchronization with timing of scanning on the liquid crystal display screen. This method is disclosed in a-literature, for example, "First Response Liquid Crystal Display" (by Taira et al., AM-LCD 1998, p 113-p 116). In this case, the backlight is made up of an LED (Light Emitting Diode) and is lit in synchronization with timing of scanning on the LCD. This causes a scanning screen like a CRT to be produced in a pseudo manner, thereby trying to improve performance of displaying moving pictures.

For example, a backlight assembly to be used for an LCD having a fluorescent layer disclosed in Patent Application Laid-open No. Hei 9-258227 is provided with a plurality of cold cathode fluorescent tubes having a length being equivalent to a liquid crystal panel and being stacked in layers in parallel and a pair of supporting plates adapted to support a fluorescent tube being coupled to an end of a cold cathode fluorescent tube, in which the fluorescent tube is sequentially lit to form a consecutive image on a screen and, in order to excite a fluorescent material (phosphor) contained in a fluorescent layer, light having a magenta color with a wavelength of 380 nm to 420 nm is emitted.

Moreover, Japanese Patent Application Laid-open No. Hei 10-10997 discloses a method for driving a display device which places a plurality of line-shaped light sources for emitting each of R, G, and B colors on a transparent light guiding plate made of an acrylic resin so that light having each of the colors extends in a scanning line direction and having a backlight device with a width of the line-shaped light sources for emitting each of the R, G, and B colors being equivalent to several tens of horizontal pixel lines employed in the liquid crystal panel in which, when the horizontal pixel line of the display panel is selected for scanning, the line-shaped light source corresponding to the driving line emits light having each of colors corresponding to its color signal.

These conventional backlight units adapted to apply light fed from the backlight in synchronization with timing of scanning on the LCD present problems in that component counts increase and a rise in costs for fabrication are unavoidable. That is, when the LED is used, since many LEDs have to be arranged on a surface of the backlight, the increase in component counts and in assembling processes are unavoidable. This presents a serious problem in the case of a large-screen-type LCD in particular.

Moreover, even when a plurality of cold cathode fluorescent tubes is used, as a size of a screen increases, a number of the cold cathode fluorescent tubes increases. Therefore, a price of the backlight rises in the case of the large-screen-type LCD.

Thus, in the conventional scanning-type backlight, though performance of displaying a moving picture is improved, costs for fabricating the backlight are high and therefore it is impossible to make low a price of the LCD device.

SUMMARY OF THE INVENTION

In view of the above, it is an object of the present invention to provide a liquid crystal display device, a backlight used for a same display device, a method for driving a same backlight and a method for manufacturing a same backlight, each of which is capable of inhibiting an increase in component counts and assembling processes and of reducing them, thereby obtaining the LCD and its backlight unit at low costs.

According to a first aspect of the present invention, there is provided a liquid crystal display device including:

a liquid crystal display section;

a backlight section used to feed illuminating light to the liquid crystal display section, wherein the backlight section includes a backlight face, a scanning electrode portion of which is made up of a plurality of scanning electrode groups each having a plurality of scanning electrodes, a plurality of light emitting layer groups, each of which is made up a plurality of light emitting layer each having a different luminescent color, and being spatially separated from each other on the backlight face; and a scanning drive circuit to scan every the light emitting layer group, as a scanning unit.

According to a second aspect of the present invention, there is provided a liquid crystal display device including:

a liquid crystal display section;

a backlight section used to feed illuminating light to the liquid crystal display section, wherein the backlight section includes a backlight face, a plurality of scanning electrodes, a plurality of light emitting layers each having a different luminescent color, and being spatially separated from each other on the backlight face, and a tone changing circuit to change light emitting time of each of the luminescent colors in a scanning direction in the backlight and thus to change a color tone in a region being scanned.

According to a third aspect of the present invention, there is provided a liquid crystal display device including:

a liquid crystal display section;

a backlight section used to feed illuminating light to the liquid crystal display section wherein a width of screen scanning in the backlight section is larger than a width of screen scanning in the liquid crystal display section.

In the foregoing, a preferable mode is one wherein the width of screen scanning in the backlight section is an integral multiple of the width of screen scanning in the liquid crystal display section.

Also, a preferable mode is one that wherein includes a unit to have a scanning phase in the backlight section lag behind a scanning phase in the liquid crystal displaying section.

According to a fourth aspect of the present invention, there is provided a liquid crystal display device including: a liquid crystal display section;

a backlight section used to feed illuminating light to the liquid crystal display section wherein the backlight section has a plurality of scanning electrodes; and a unit to have a scanning phase in the backlight section lag behind a scanning phase in the liquid crystal display section, wherein backlight light is fed after a response by the liquid crystal display section.

In the foregoing, a preferable mode is one wherein, in the liquid crystal display section, illuminating light for displaying is applied from the backlight section to a pixel existing in a vicinity of a selected scanning line and illuminating light for displaying is not applied from the backlight section to a pixel in a non-selected scanning line.

Also, a preferable mode is one wherein the liquid crystal display section is driven in a simple matrix manner.

Also, a preferable mode is one that wherein includes a unit to change light emitting time in a region where light is being fed in a scanning direction in the backlight, thus to change maximum luminance of light in the region being scanned.

Furthermore, a preferable mode is one that wherein is provided with a light diffusing layer between the liquid crystal display section and the backlight section to diffuse light fed from the backlight section in a plane direction inside the light diffusing layer.

According to a fifth aspect of the present invention, there is provided a liquid crystal display device including:

a liquid crystal display section;

a backlight section used to feed illuminating light to the liquid crystal display device; and a prism layer made up of a single layer or a plurality of layers used to change light fed from the backlight section into light having directivity, being mounted between the liquid crystal display section and the backlight section.

In the foregoing, a preferable mode is one that wherein the backlight section, the prism layer, a light diffusing layer used to diffuse light fed through the prism layer from the backlight section in a plane direction inside the light diffusing layer and the liquid crystal display section, which are stacked in layers in this order.

According to a sixth aspect of the present invention, there is provided a liquid crystal display device including:

a liquid crystal display section;

a backlight section used to feed illuminating light to the liquid crystal display section; and an anti-EMI (Electro-Magnetic Interference) filter layer being mounted between the liquid crystal display section and the backlight section.

In the foregoing, a preferable mode is one wherein the anti-EMI filter layer is mounted internally in the liquid crystal displaying section.

According to a seventh aspect of the present invention, there is provided a liquid crystal display device including:

a liquid crystal display section;

a backlight section used to feed illuminating light to the liquid crystal display section; and wherein the backlight section, an anti-EMI filter layer, a light diffusing layer used to diffuse light fed through the anti-EMI filter layer from the backlight section in a plane direction inside the light diffusing layer and the liquid crystal display section, and the liquid crystal display section are arranged in this order.

According to an eighth aspect of the present invention, there is provided a liquid crystal display device including:

a liquid crystal display section;

a backlight section used to feed illuminating light to the liquid crystal display section; and either of an infrared ray absorbing layer to absorb infrared rays or an infrared ray reflecting filter layer to reflect infrared rays, both being mounted between the liquid crystal display section and the backlight section.

According to a ninth aspect of the present invention, there is provided a liquid crystal display device having four sides including:

a liquid crystal display section provided with a plurality of scanning lines and a plurality of signal lines;

a backlight section used to feed illuminating light to the liquid crystal display section and being provided with a plurality of scanning electrodes;

wherein a side at which there is placed a terminal portion of each of the plurality of scanning lines and the plurality of the signal lines in the liquid crystal display section are different from a side at which there placed a terminal portion of the plurality of the scanning electrodes in the backlight section.

In the foregoing, a preferable mode is one wherein light fed from the backlight section is generated by discharge in a gas.

Also, a preferable mode is one wherein a gas is filled in the backlight section in a hermetic manner and wherein light fed from the backlight section is fluorescent light emitted from a fluorescent material (phosphor) excited by excitation light generated by discharge in the gas.

Also, a preferable mode is one wherein a fluorescent layer is mounted on a front face of the liquid crystal display section and wherein light fed from the backlight section, after having passed through the liquid crystal display section, enters into the fluorescent layer.

Also, a preferable mode is one wherein the backlight section is maintained under vacuum and has a scanning electrode used to scan an electron source and an electron fed from the electron source is guided into a fluorescent layer and wherein light fed from the backlight section is produced by accelerating electrons under the vacuum and injecting the accelerated electrons into the fluorescent layer.

Also, a preferable mode is one wherein the backlight section is provided with an electroluminescent device and light fed from the backlight section is electroluminescent light.

Also, a preferable mode is one wherein the backlight section includes a plurality of light emitting layers each having a luminescent color, and being spatially separated from each other on a principal face of the backlight, and in scanning of the backlight section, each of the luminescent colors is independently is scanned, and wherein timing of scanning on a screen of the liquid crystal display section is synchronized with timing of scanning on a screen of the backlight section.

Also, a preferable mode is one wherein the backlight section includes a plurality of light emitting layer groups, each of which is made up of a plurality of light emitting layers each having a different luminescent color, and being spatially separated from each other on a principal face of the backlight, and in scanning of the backlight section, each of the light emitting layer groups is scanned as a scanning unit, and wherein timing of scanning on a screen of the liquid crystal display section is synchronized with timing of scanning on a screen of the backlight section.

Also, a preferable mode is one wherein screen scanning in the liquid crystal display section and in the backlight section is performed in a same period.

Also, a preferable mode is one wherein a screen scanning period in the liquid crystal display section is equal to a screen scanning period in the backlight section and wherein screen scanning in the liquid crystal display section is performed once during a period when screen scanning in the backlight section is performed two or more times.

According to a tenth aspect of the present invention, there is provided a plane-type backlight including:

a first substrate and a second substrate being mounted apart from each other wherein gas is fed into space existing between the first substrate and the second substrate and a portion surrounding the space is sealed in a hermetic manner;

a common electrode being mounted on the first substrate;

a plurality of scanning electrodes being mounted on the second substrate; and wherein a voltage is applied between the common electrode and each of the scanning electrode to cause discharging to occur in the space between the first substrate and the second substrate and wherein light is emitted by exciting a fluorescent material being arranged between the first substrate and the second substrate; and wherein the common electrode is made up of electrodes formed so as to be at a same potential on an entire light emitting face.

According to an eleventh aspect of the present invention, there is provided a plane-type backlight including;

a first substrate and a second substrate being mounted apart from each other wherein gas is fed into space existing between the first substrate and the second substrate and a portion surrounding the space is sealed in a hermetic manner;

a common electrode being mounted on the first substrate;

a plurality of scanning electrodes being mounted on the second substrate; and wherein a voltage is applied between the common electrode and each of the scanning electrode to cause discharging to occur in the space existing between the first substrate and the second substrate and wherein light is emitted by exciting a fluorescent material being arranged between the first substrate and the second substrate and wherein the common electrodes and the plurality of scanning electrodes are made up of a plurality of belt-shaped electrodes being extended in a same direction; and a unit used to sequentially select one scanning electrode out of the plurality of scanning electrodes.

In the foregoing, a preferable mode is one wherein the common electrode and the plurality of the scanning electrode both being made up of the belt-shaped electrodes are configured to deviate positionally from each other by a half period.

According to a twelfth aspect of the present invention, there is provided a plane-type backlight including:

a first substrate and a second substrate being mounted apart from each other wherein gas is fed into space existing between the first substrate and the second substrate and a portion surrounding the space is sealed in a hermetic manner;

a common electrode being mounted on the first substrate;

a plurality of scanning electrodes being mounted on the second substrate;

wherein a voltage is applied between the common electrode and each of the scanning electrode to cause discharging to occur in the space existing between the first substrate and the second substrate and wherein light is emitted by exciting a fluorescent material being arranged between the first substrate and the second substrate; and a protrusion being protruded toward a side of discharging space existing between electrodes facing each other on at least one of the common electrode and the plurality of the scanning electrode.

In the foregoing, a preferable mode is one wherein the protrusion is placed on a dielectric layer used to electrically insulate the discharging space from the electrode.

Also, a preferable mode is one wherein the protrusion is placed on an electrode being exposed in the discharging space.

Also, a preferable mode is one wherein the common electrode and the plurality of the scanning electrode are respectively made up of a plurality of belt-shaped electrodes being extended in a same direction and each of the belt-shaped electrodes corresponds to each luminescent color having one of RGB (red, green, and blue) colors.

Also, a preferable mode is one wherein the common electrode and the scanning electrode are made up of belt-shaped electrodes intersecting at right angles to each other and each of the belt-shaped electrodes corresponds to each luminescent color having one color out of the RGB colors.

According to a thirteenth aspect of the present invention, there is provided a plane-type backlight including:

a first substrate and a second substrate being mounted apart from each other wherein gas is fed into space existing between the first substrate and the second substrate and a portion surrounding the space is sealed in a hermetic manner;

a common electrode and a plurality of scanning electrodes being mounted on the first substrate;

wherein a voltage is applied between the common electrode and the scanning electrode to cause discharging to occur in the space existing between the first substrate and the second substrate and wherein light is emitted by exciting a fluorescent material being arranged between the first substrate and the second substrate and a unit used to sequentially select one scanning electrodes out of the plurality of scanning electrodes.

In the foregoing, a preferable mode is one wherein, on the first substrate, the common electrode and the plurality of the scanning electrodes are formed in a same face and the belt-shaped scanning electrode is arranged between common electrodes a plane of which is of a comb-teeth shape.

Also, a preferable mode is one wherein the common electrode and the scanning electrode are stacked in layers with an insulating film interposed between the common electrode and the scanning electrode on a side of the first substrate and wherein an opening is provided on the electrode mounted on a first layer out of the electrodes being stacked in two layers.

Also, a preferable mode is one wherein at least one of the common electrodes and of the scanning electrodes is made up of a plurality of belt-shaped electrodes and a control electrode used to inhibit expansion of light emission is mounted between two belt-shaped electrodes adjacent to each other.

According to a fourteenth aspect of the present invention, there is provided a discharging-type backlight for a liquid crystal display device including:

an auxiliary discharging region existing adjacent to an outside of a light emitting region for displaying in a light emitting region for discharging in which scanning lines being adjacent to each other to initiate light emitting for scanning do not emit light, which causes discharging to occur immediately before initiation of at least light emitting for scanning.

In the foregoing, a preferable mode is one wherein the auxiliary discharging region keeps discharging continuously during light emission for scanning and discharging.

Also, a preferable mode is one wherein an area of an auxiliary discharging electrode used to have discharging occur in the auxiliary discharging region is smaller than that of an electrode used to emit light for scanning and discharging.

Also, a preferable mode is one wherein a thickness of a dielectric layer covering the auxiliary discharging electrode is greater than that of a dielectric layer covering an electrode used to emit light for scanning and discharging.

Also, a preferable mode is one wherein a fluorescent material is not placed in a portion surrounding the auxiliary discharging region.

Also, a preferable mode is one wherein a partition wall is placed outside of a light emitting region for discharging in which scanning is initiated and invasion of light for discharging in a region in which discharging is kept continuously into a light emitting region for scanning is reduced.

Also, a preferable mode is one wherein a region in which light emission for scanning is initiated is placed outside of a displaying region.

Also, a preferable mode is one wherein an electrode for discharging to initiate light emission for scanning is placed outside of the displaying region.

According to a fifteenth aspect of the present invention, there is provided a method for driving a plane discharging-type backlight which includes a first glass substrate and a second glass substrate, a first electrode formed on the first glass substrate, a second electrode formed on the second glass substrate, at least one of which is covered with a dielectric layer, wherein gas is fed into space formed between the first glass substrate and second glass substrate and a portion surrounding the space is sealed in a hermetic manner and wherein a voltage is applied between the first and the second electrode to have discharging occur in a space between the first and the second glass substrate and light is emitted by exciting a fluorescent material being placed between the first glass and the second glass substrate, the method including:

a step of constructing at least one of the first and second electrodes to have discharging occur of a plurality of belt-shaped electrodes; and a step of applying a DC (direct current) voltage to one belt-shaped electrode out of the plurality of belt-shaped electrodes during light emission for scanning and discharging in a region in which the belt-shaped electrode emits light for discharging and of applying a sine waveform voltage or a rectangular waveform voltage to another electrode opposed to the belt-shaped electrode.

In the foregoing, a preferable mode is one wherein scanning is performed on light emitting region for discharging by scanning a DC voltage to be applied to the belt-shaped electrode.

Also, a preferable mode is one wherein intensity of light emitted for scanning and discharging is varied by changing a DC voltage value to be applied to the belt-shaped electrode.

Also, a preferable mode is one wherein a width of a region of light emission for scanning is varied by changing a number of belt-shaped electrodes to which the DC voltage is applied.

Also, a preferable mode is one wherein luminance of light fed from the backlight is varied by changing a frequency of an AC (alternating current) voltage to be applied to the another electrode.

According to a sixteenth aspect of the present invention, there is provided a liquid crystal display device having a liquid crystal display section and a backlight described above and scanning on the backlight and scanning on the liquid crystal display section are performed in a same period.

According to a seventeenth aspect of the present invention, there is provided a method for manufacturing a backlight including:

a step of forming a scanning electrode, a common electrode, and a fluorescent layer on either of two substrates;

a step of forming a seal layer having a plurality of partitions on either of the two substrates; and a step of collectively forming a plurality of backlight units by bonding the two substrates together and cutting the bonded two substrates for every sealing partition and by filling gas in a hermetic manner into each sealing partition.

According to an eighteenth aspect of the present invention, there is provided a method for manufacturing a backlight including:

a step of forming a scanning electrode, a common electrode, and a fluorescent layer on either of two substrates;

a step of forming a seal layer having a plurality of partitions on either of the two substrates; and a step of collectively forming a plurality of backlight units by bonding the two substrates together and filling gas in a hermetic manner and then cutting the bonded two substrates filled with gas for every sealing partition.

With the above configuration, a scanning electrode is formed internally in a backlight section and scanning is performed on a surface of the backlight section in a light emitting portion and, therefore, it is possible to reduce component counts, to simplify manufacturing processes, and to reduce costs. Also, since illuminating light emitted from the backlight is scanned and non-displaying period is provided, a performance of displaying moving pictures is improved.

With another configuration, since one time scanning is performed on a screen in a liquid crystal display section within a predetermined period and two or more times scanning are performed on a screen in a backlight, occurrence of a flicker can be prevented.

With still another configuration, since a protrusion is formed on a side of discharging space existing between electrodes facing each other in a backlight, control can be exerted in a place in which discharge as seeds occurs and in a place in which strong discharging occurs, thus enabling uniform and stable discharging to be achieved.

With still another configuration, since an auxiliary discharging area is formed in a place being adjacent to a region being scanned in a backlight and, in this auxiliary discharging area, discharging occurs immediately before occurrence of discharging in a head portion of the region being scanned, or discharging is maintained all the time and, since excited atoms and molecules, electrons, or ions serving as seeds of discharge are fed, it is possible to have discharging that rises in a stable and speedy manner occur, as in the case of other region being scanned.

With still another configuration, since redundancy is provided to a scanning light emission region in a backlight, high reliability is given to a displaying characteristic of a liquid crystal display panel which performs driving for scanning by using the backlight.

BRIEF DESCRIPTION OF THE DRAWINGS

The above and other objects, advantages, and features of the present invention will be more apparent from the following description taken in conjunction with the accompanying drawings in which:

FIGS. 7A, 7B, and 7C are timing charts explaining the LCD of a ninth embodiment of the present invention;

FIG. 8 is a diagram illustrating configurations of an LCD according to a twelfth embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
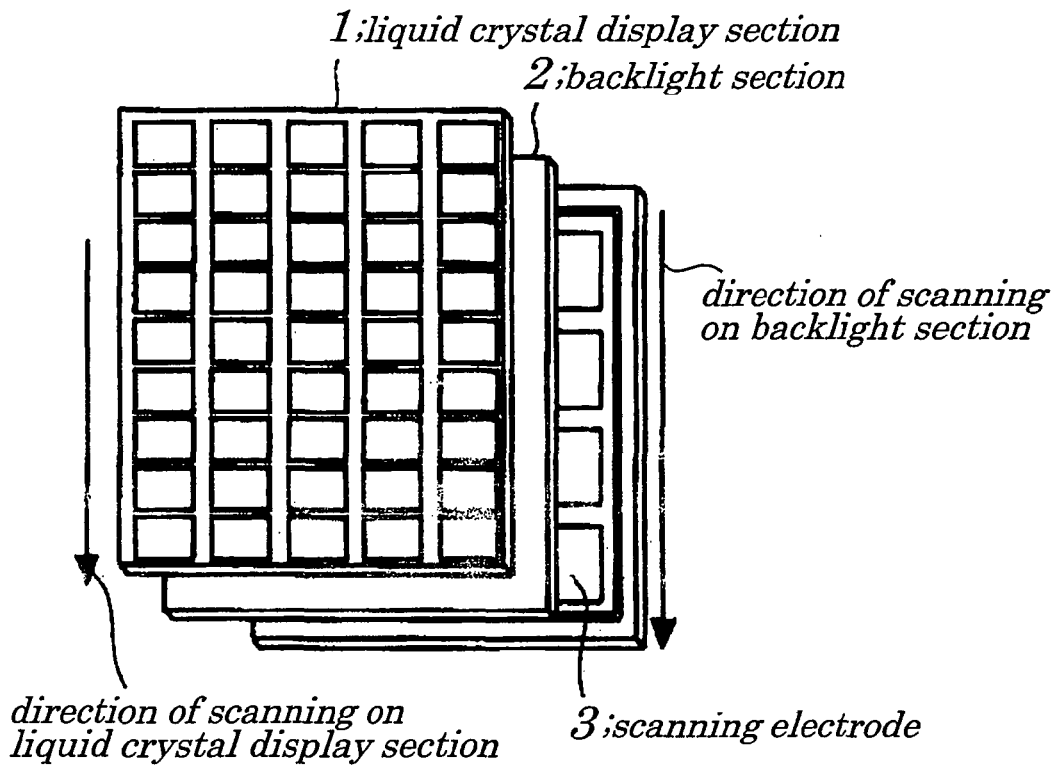
FIG. 1 is a diagram illustrating an LCD according to a first embodiment of the present invention.

FIG. 1 is a diagram illustrating an LCD according to a first embodiment of the present invention. As shown in FIG. 1, the LCD of the present invention is provided with a liquid crystal display section 1 and a backlight section 2 adapted to supply illuminating light to the liquid crystal display section 1, at a back of which a plurality of scanning electrodes 3 is provided each performing scanning on a screen of both the liquid crystal display section 1 and of the backlight section 2 at a same time. More particularly, the LCD is so configured that the, scanning electrode 3 is mounted at a back of the backlight section 2 and that, by scanning on a surface of the backlight section 2 (see arrows representing a direction of "backlight scanning"), light is emitted in a region for the scanning electrode 3 that has been selected. By configuring above, reduction of component counts is achieved. Moreover, by providing a non-display period when scanning is performed on illuminating light emitted from the backlight section 2, a performance of displaying moving pictures is improved.

Figure 2:
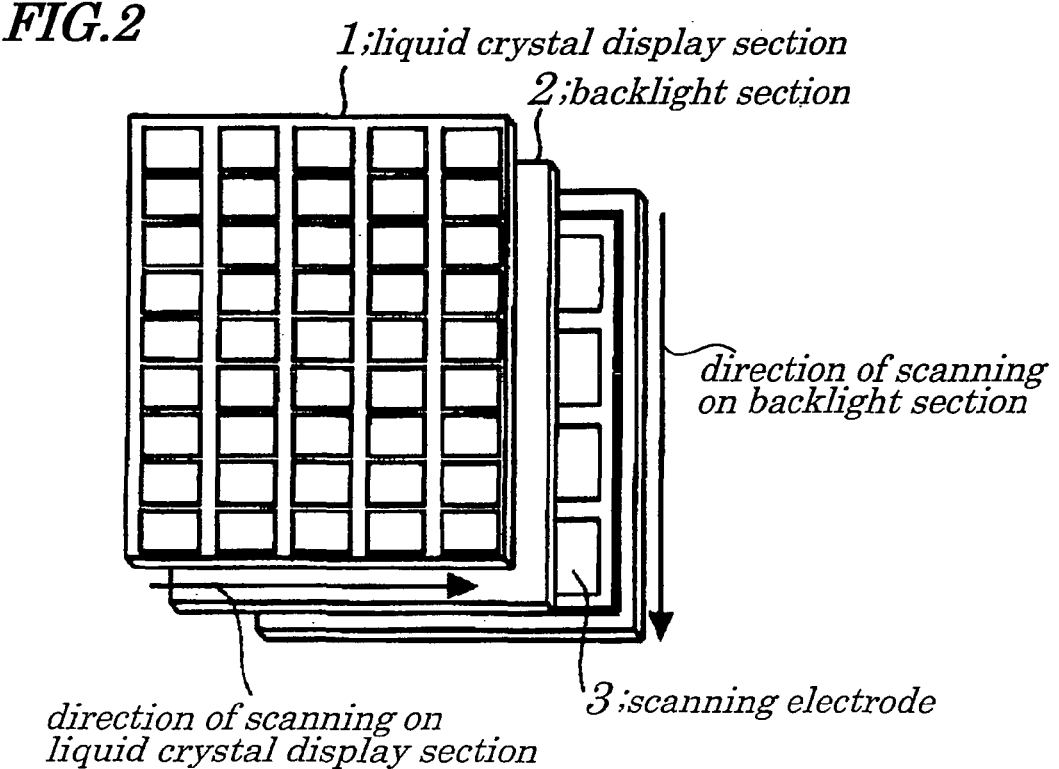
FIG. 2 is a diagram illustrating an LCD according to a second embodiment of the present invention.

In the LCD shown in FIG. 1, scanning directions on the backlight section 2 and on the liquid crystal display section 1 are same. However, it is not always necessary that scanning directions on the backlight section 2 and on the liquid crystal display section 1 are same. That is, in the LCD of the present invention, for example, as shown in FIG. 2, the scanning direction on the backlight section 2 (see the arrow for scanning on the backlight section 2) and the scanning direction on the liquid crystal display section 1 (see the arrow for scanning on the liquid crystal display section 1) may intersect at right angles each other. Even by configuring above, same effects as obtained in the first embodiment can be achieved.

Second Embodiment

FIG. 2 is a diagram illustrating an LCD according to a second embodiment of the present invention. The LCD of the second embodiment of the present invention is made up of a liquid crystal display section 1 and a backlight section 2, in which the backlight section 2 has a plurality of scanning electrodes 3 and a period of scanning on a screen of the liquid crystal display section 1 and a period of scanning on a screen of the backlight section 2 are same in which scanning on the screen of the liquid crystal display section 1 is performed once while scanning is performed on the screen of the backlight section 2 "n" times.

Figure 3A:
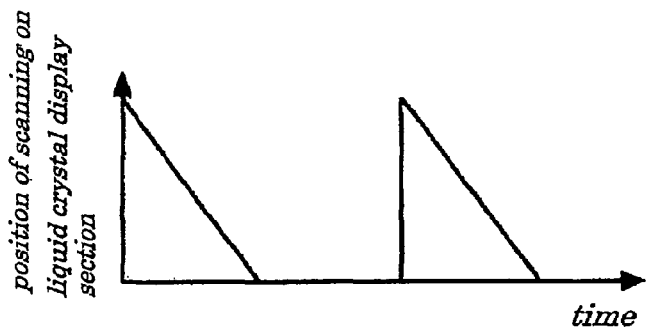
FIGS. 3A and 3B are timing charts each explaining operations of the LCD of the second embodiment.
Figure 3B:
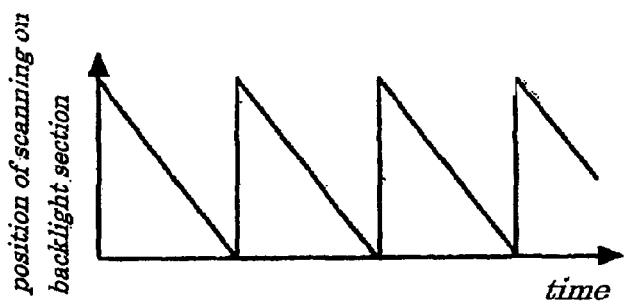

The operation of the LCD of the second embodiment is explained presuming that n=2, by using FIG. 3A-3B. In FIG. 3A-3B, the period of scanning on the screen of the liquid crystal display section 1 and a period of scanning on the backlight section 2 are same. Moreover, while scanning on the screen of the backlight section 2 is performed twice (see FIG. 3B), scanning on the screen of the liquid crystal display section 7 is performed once (see FIG. 3A). Therefore, same information is displayed on the screen of the liquid crystal display section 1 every two times' scanning on the screen of the backlight section 2.

Generally, the scanning on the screen of the liquid crystal display section 1 is performed at a frequency of as low as 60 Hz. When the scanning on the screen of the liquid crystal display section 1 and the scanning on the screen of the backlight section 2 are performed in synchronization at this frequency (60 Hz), light luminance distribution of a display signal at the frequency of 60 Hz occurs. This is perceived by a person seeing the displayed screen partially to be a flicker. By performing the scanning on the liquid crystal display section 1 and on the backlight section 2 at a speed being twofold higher compared with the conventional case and in a manner that the scanning on both the liquid crystal display section 1 and the backlight section 2 is synchronous, it is possible to prevent the occurrence of a flicker.

Moreover, as in the case of the LCD of the present invention, by performing scanning on the liquid crystal display section 1 and the backlight section 2 during a period corresponding to a frequency of 120 Hz and then by suspending the scanning on the screen of the liquid crystal display section 1 to perform only the scanning on the screen of the backlight section 2, the occurrence of the flicker can be prevented.

Thus, an example of operations occurring when n=2, that is, when the scanning on the screen of the liquid crystal display section 1 is performed once while the scanning on the screen of the backlight section 2 is performed twice within a predetermined period of time is explained.

By performing the scanning on the screen of the liquid crystal display section 1 once and by performing the scanning on the screen of the backlight section 2 multiple numbers of times within a predetermined period of time, it is also possible to prevent the flicker.

Third Embodiment

An LCD of a third embodiment of the present invention has a scanning mechanism in a backlight section made up of a group of light emitting layers each having a different luminescent color and a scanning electrode portion in the backlight section is constructed of a plurality of kinds of scanning electrode groups each having a plurality of scanning electrodes.

Fourth Embodiment

Figure 4:
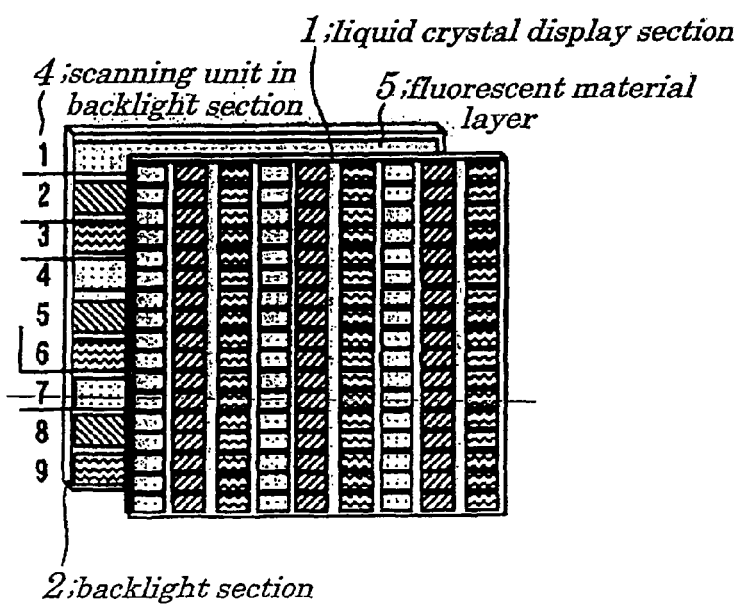
FIG. 4 is a diagram illustrating configurations of an LCD according to a fourth embodiment of the present invention.

FIG. 4 is a diagram illustrating configurations of an LCD according to a fourth embodiment of the present invention. In the LCD of the fourth embodiment of the present invention, light emitting layers are spatially separated from each other on a principal face of the backlight section 2 and each luminescent color is scanned independently. The LCD of the fourth embodiment is explained by referring to FIG. 4.

The luminescent colors in the backlight section 2 are provided in a form of a horizontal stripe and one of three primary colors (red, green, and blue) occurs every third color stripe. One piece of the horizontal stripe for the luminescent color is handled as a scanning unit.

In the example shown in FIG. 4, a scanning unit in backlight section 4 numbers 1, 4, and 7 represent the red color, the scanning unit in backlight section 4 numbers 2, 5, and 8 represent the green color, and the scanning unit in backlight section 4 numbers 3, 6, and 9 represent the blue color. In FIG. 4, simply for the sake of convenience in drawing pictures, each of the luminescent colors in red, green, and in blue is represented by patterns.

Figure 5A:
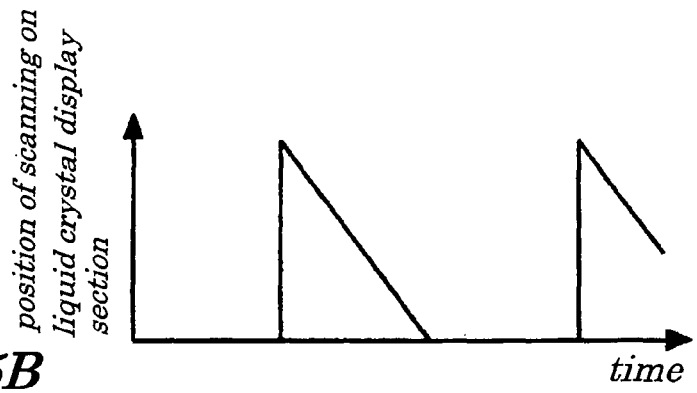
FIGS. 5A and 5B are timing charts each explaining operations of the LCD of the fourth embodiment of the present invention.
Figure 5B:
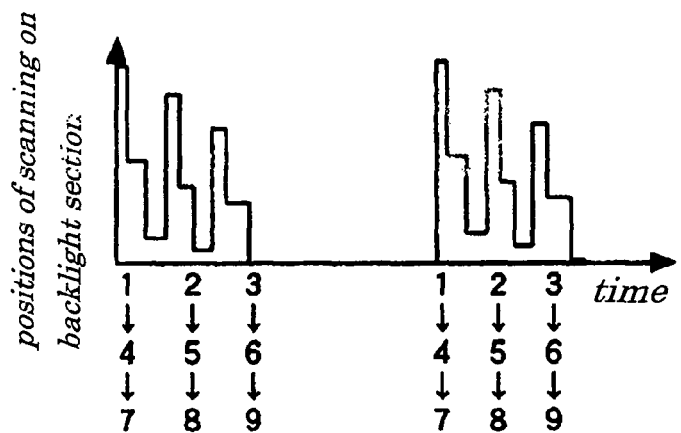

Scanning timing for operations of the LCD of the fourth embodiment is explained by referring to FIGS. 5A and 5B. As shown in FIGS. 5A and 5B, after the scanning on the screen of the liquid crystal display section 1 has been performed (see FIG. 5A), the backlight section 2 is scanned in order of the scanning unit numbers 1 to 4, and to 7 to complete display of the red color and then in order of the scanning unit numbers 2 to 5, and 8 to complete display of the green color and further in order of the scanning unit numbers 3 to 6, and to 9 to complete display of the blue color (see FIG. 5B). This achieves display of full colors.

Fifth Embodiment

In an LCD according to a fifth embodiment of the present invention, each of luminescent colors is provided spatially in a separate manner within a face of the backlight and scanning is performed in unit of a plurality of light emitting layers each providing light having a different luminescent color. Its operations are described by referring to FIG. 4. In FIG. 4, scanning is performed on a set of the scanning units (1, 2, and 3) to have them emit light. Then, the scanning is performed on a set of the scanning units (4, 5, and 6) and then on a set of the scanning units (7, 8, and 9) to have them emit light.

By operating as above, light is emitted in a horizontal stripe manner in which the red, green, and blue colors are arranged in an adjacent manner, thus enabling scanning on a screen to be performed.

Moreover, after having the set of the scanning units (1, 2, and 3) emit light, it is possible to have the sets of the scanning units (2, 3 and 4) and (3, 4, and 5) emit light.

Figure 6:
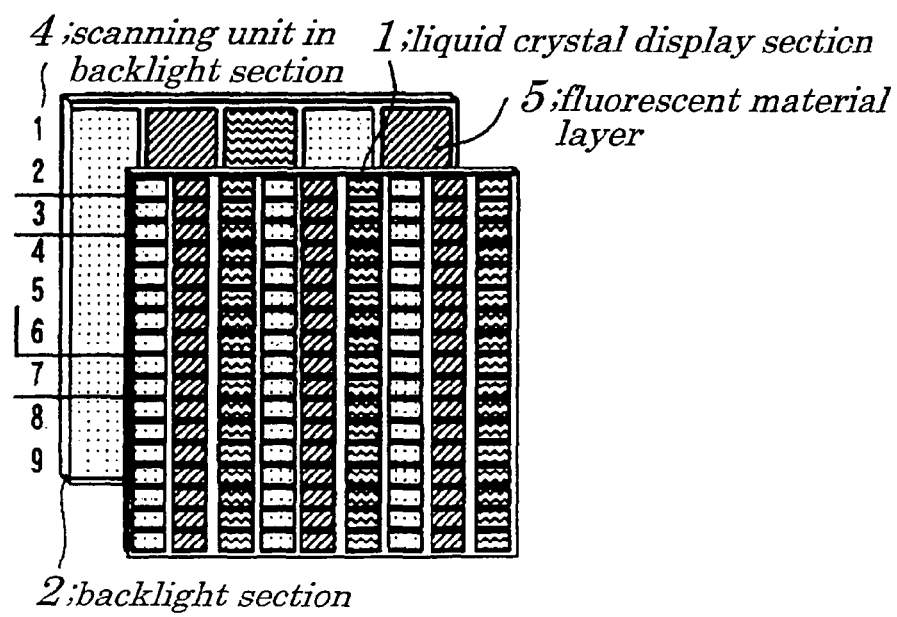
FIG. 6 is a diagram illustrating configurations of an LCD according to a seventh embodiment of the present invention.

Furthermore, in this embodiment, the scanning can be performed on a set containing different luminescent colors as one scanning unit such as a scanning unit 4 shown in FIG. 6. In this case, scanning is performed in order of the scanning numbers 1, 2, 3, 4, 5, 6, 7, 8, and 9 to have them emit light.

Sixth Embodiment

An LCD of a sixth embodiment of the present invention is described. In this embodiment, by changing light emitting time for each of luminescent colors in a region in a scanning direction, a color tone in a region in a scanning direction is altered.

In the configuration shown in FIGS. 3A and 3B, light having a single color is emitted for every one scanning unit. Therefore, highlighting of a red display on a screen can be achieved by lengthening light emitting time. Thus, by calibrating light emitting time for each luminescent color, it is possible to create a screen having a desired color tone.

Seventh Embodiment

FIG. 6 is a diagram illustrating configurations of the LCD according to the seventh embodiment of the present invention. The LCD of this embodiment is so configured that a width of screen scanning on a liquid crystal display section 1 is smaller than that of screen scanning on a backlight section 2. In the configuration shown in FIG. 6, the width of screen scanning on the backlight section 2 is set to be larger than the width of screen scanning on the liquid crystal display section 1. According to the seventh embodiment, the backlight section 2 can be fabricated at lower costs because fine working on the backlight section 2 is not required.

Eighth Embodiment

In an LCD of an eighth embodiment, a width of screen scanning in a backlight section 2 is approximately an integral multiple of that of screen scanning in a liquid crystal display section 1. In the LCD of the above seventh embodiment, a width of screen scanning in the backlight section 2 is larger than that of screen scanning in the liquid crystal display section 1. However, it is necessary that timing for scanning on the liquid crystal display section 1 synchronizes timing for scanning on the backlight section 2. In order to achieve this, the width of screen scanning in the backlight section 2 is set to be an integral multiple of the width of screen scanning in the liquid crystal display section 1. Thus, by multiplying one scanning signal, another scanning signal can be produced and the scanning can be synchronized with each other.

Ninth Embodiment

FIG. 7 is a timing chart explaining operations of an LCD of a ninth embodiment of the present invention. In the LCD of the ninth embodiment, scanning on a screen of a backlight section 2 is performed in prior to scanning on a screen of a liquid crystal display section 1. When timing of scanning on the backlight section 2 is synchronized with timing of scanning on the liquid crystal display section 1, scanning is performed at a same frequency and in a same phase state. In FIGS. 7A, 7B, and 7C, positions of scanning on a backlight section {circle around (1)} (see FIG. 7B) and of scanning on the backlight section 2 (see FIG. 7A) are in a same phase and its phase lag is zero.

However, in general, response time required for lighting up the backlight section 2 is shorter than that required for lighting up the liquid crystal display section 1. Therefore, if positions of scanning on the backlight section and scanning on the liquid crystal display section 1 match each other (see FIG. 7B), illumination by the backlight section 2 is provided before a full response by the liquid crystal display section 1 is made.

In the LCD of the ninth embodiment, as shown as the position of scanning on the backlight section {circle around (2)}, a scanning phase in the backlight section lags a scanning phase in the liquid crystal display section 1. By configuring as above, after a full response has been made in the liquid crystal display section 1, supply of backlight light is made possible. This enables more clear images to be obtained. Thus, the LCD of the ninth embodiment can be applied not only when the scanning shown in FIG. 1 is performed, that is, when the direction of the scanning on the liquid crystal display section 1 matches that of the scanning on the backlight section 2 but also when the scanning shown in FIG. 2 is performed, that is, when the direction of the scanning on the liquid crystal display section 1 intersects that of the scanning on the backlight section 2 at right angles.

Tenth Embodiment

In an LCD of a tenth embodiment, a liquid crystal display section 1 is driven by a simple matrix form. In a simple matrix driven-type LCD, it is known that, as a number of scanning lines increases more, a contrast ratio becomes lower. In the case of the simple matrix form, application of an excessive voltage to a pixel on a non-selected scanning line at a time of scanning on a screen causes low contrast.

However, in the liquid crystal display section 1 of the present invention, illuminating light for display is fed from a backlight section 2 only to pixels existing in a vicinity of selected scanning line and no illuminating light for displaying is fed to an pixel on a non-selected scanning. Therefore, since display luminance of light fed from the pixel on the non-selected scanning line is lowered which causes low contrast, a contrast ratio in the simple matrix driving-type LCD can be improved.

The operation of an LCD having 1,000 pieces of scanning lines is described as an example. When this LCD is driven by a simple matrix form at a duty ratio of 1000, its contrast ratio becomes very low.

On the other hand, by using light having a width of a scanning line fed from the backlight being equivalent to ten pieces of the scanning lines in the liquid crystal display section 1 (by driving control on a scanning electrode existing at a back of the backlight section), a contrast ratio being obtained by driving the LCD by a simple matrix at a duty ratio of about ten can be realized. Thus, according to the present invention, even in the case of the simple matrix driving LCD, a high contract ratio can be achieved.

Eleventh Embodiment

In an LCD of an eleventh embodiment, by changing light emitting time in a region in a scanning direction, maximum luminance of light in a region being scanned is altered. Equal assignment of scanning line selecting time in a backlight section to all scanning lines is not necessary. For example, by assigning longer time for selection of the scanning line in a center of a screen of the backlight section 2, luminance of light in the center of the screen can be increased. By operating as above, light luminance distribution on a whole screen can be set in a freely variable manner.

Twelfth Embodiment

In an LCD of a twelfth embodiment, at least one of a light diffusing layer 6 and at least one of a prism layer are provided between a backlight section 2 and a liquid crystal display section 1.

If a scanning electrode is mounted at a back of the backlight section 2, emitting of light in a region between the scanning electrodes is made difficult. As a result, uniform illuminating light on an entire screen is made impossible.

In this embodiment, as shown in FIG. 8, the light diffusing layer 6 is mounted between the backlight section 2 and a liquid crystal display section 1 and light fed from the backlight section 2 is diffused in a plane direction inside the light diffusing layer 6. By configuring above, uniform illumination is achieved in a position corresponding to a region between scanning electrodes.

Moreover, when the liquid crystal display section 1 is superimposed on the backlight section 2, a moire stripe is produced. This occurs because a position and/or a pitch of a pixel of the liquid crystal display section 1 does not match a position and/or a pitch of the scanning electrode existing at a back of the backlight section 2.

In order to solve these problems, the light diffusing layer 6 is incorporated which can effectively prevent the moire stripe.

Moreover, generally, light fed from the backlight section 2 is perfectly diffused light in many cases.

Figure 9:
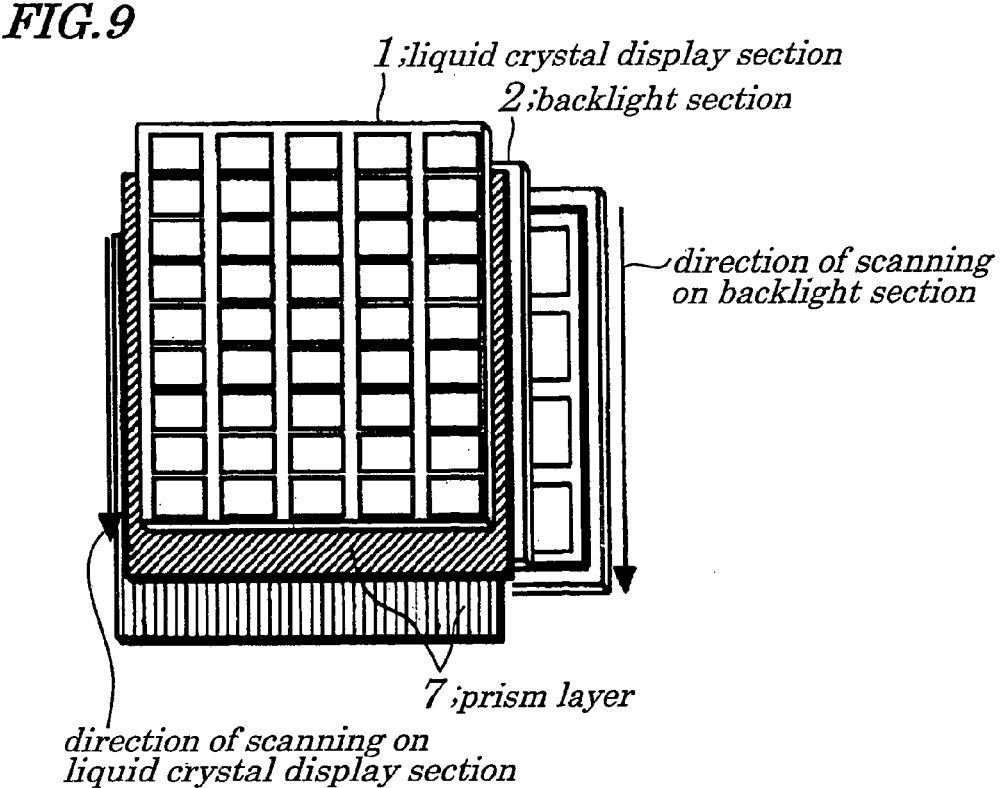
FIG. 9 is a diagram illustrating another configuration of the LCD according to the twelfth embodiment of the present invention.

In the LCD of the twelfth embodiment, as shown in FIG. 9, a single or a plurality of prism layers 7 is mounted to change perfectly diffused light into light having directivity.

In this case also, due to nonconformity in a pitch among the prism layers 7, the scanning electrode existing at a back of the backlight section 2, and pixels in the liquid crystal display section 1, the moire stripe occurs in some cases. To avoid this problem, combined use of the prism layer 7 and light diffusing layer 6 may be employed.

Figure 10:
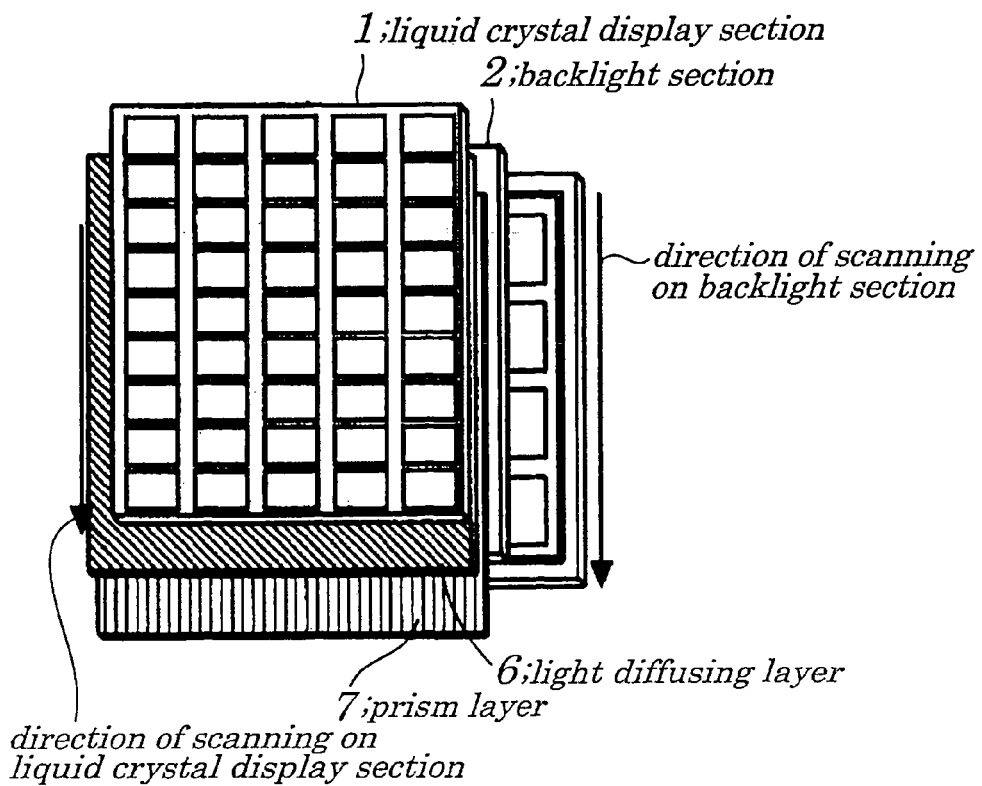
FIG. 10 is a diagram illustrating still another configuration of the LCD according to the twelfth embodiment of the present invention.

In the LCD of the twelfth embodiment in which both the prism layer and light diffusing layer are employed, as shown in FIG. 10, the backlight section 2, prism layer 7, light diffusing layer 6, and the liquid crystal display section 1 are stacked in layer in this order.

Thirteenth Embodiment

As light to be fed from a backlight section 2, light generated by discharge in a gas is used. In this case, discharging occurs between a plurality of scanning electrodes and a plurality of common electrodes. Moreover, by creating a plurality of partitions within the backlight section 2 and feeding various kinds of gases into the partitions in a hermetic sealed manner, a plurality of luminescent colors can be obtained.

Fourteenth Embodiment

In an LCD of a fourteenth embodiment of the present invention, as light to be fed from a backlight section 2, fluorescent light emitted from a fluorescent material (phosphor) excited by light produced through discharge in a gas is used. In this case, discharging occurs between a plurality of scanning electrodes and a plurality of common electrodes. Single gas is fed into the backlight section 2 in a sealed manner. Moreover, by changing a color of a fluorescent material using a printing process, a different luminescent color can be obtained.

Fifteenth Embodiment

In an LCD of a fifteenth embodiment, as light to be fed from a backlight section 2, light generated by discharge in a gas is used. The light, after having passed through a liquid crystal display section 1, enters a fluorescent material. In this case, a fluorescent material layer is arranged on a front of the liquid crystal display section. A color of the fluorescent layer is changed by using a fluorescent material having a different luminescent color in a plane direction. This enables display of full colors.

Sixteenth Embodiment

In an LCD of a sixth embodiment, as light to be fed from a backlight section 2, light produced by accelerating electrons in a vacuum and by having light generated by the acceleration of electrons enter a fluorescent material is used. In the embodiment, an inside portion of the backlight section 2 is maintained under vacuum and scanning electrodes each being able to scan an electron source are provided therein. Moreover, arrangement is made so that an electron beam from the electron source is guided into a fluorescent layer. By changing a color of the fluorescent layer, the backlight section 2 having a plane face portion adapted to emit light having a different luminescent color can be achieved.

Seventeenth Embodiment

In an LCD of a seventeenth embodiment, as light to be fed from a backlight section 2, electroluminescent light is used. In the embodiment, an electroluminescent material made of an organic material or inorganic material is used for backlight. By changing a color of a light emitting layer made of the electroluminescent material, light providing a different luminescent color can be obtained within a face. Moreover, by placing a scanning electrode group and a mechanism to drive it, a backlight section 2 being capable of performing scanning is obtained.

Eighteenth Embodiment

An LCD of an eighteenth embodiment has an anti-EMI (Electromagnetic Interference) filter between a liquid crystal display section 1 and a backlight section 2.

Figure 11:
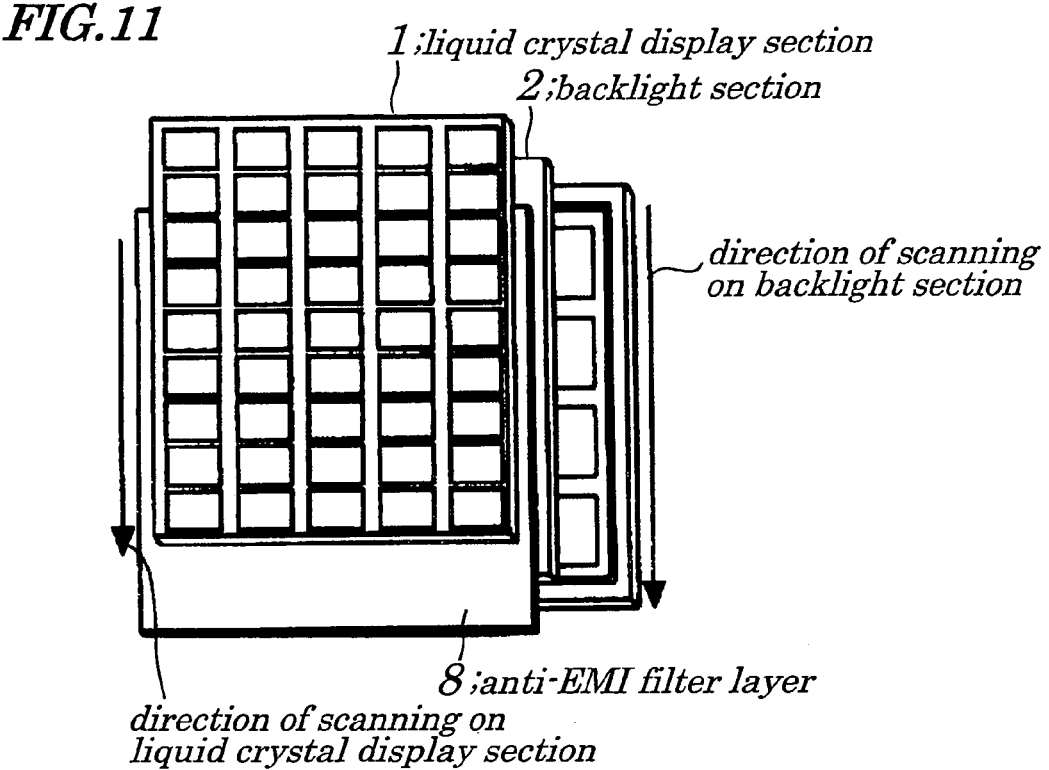
FIG. 11 is a diagram illustrating configurations of an LCD according to an eighteenth embodiment of the present invention.

Ordinarily cases, electromagnetic interference occurs in a backlight section irrespective of its type. As a result, noise or the like are produced in the liquid crystal display device which causes a display failure. In the LCD of the above embodiments, since a scanning electrode is placed for scanning, such the display failure presents a serious problem. In order to solve this problem, according to the eighteenth embodiment, as shown in FIG. 11, the anti-EMI filter layer 8 is placed between the backlight section 2 and the liquid crystal display device 1 which prevents occurrence of the display failure.

Nineteenth Embodiment

An LCD of a nineteenth embodiment has an anti-EMI filter layer 8 within a liquid crystal display section 1. As the anti- EMI filter layer 8, a mesh-shaped conductor is preferably used. The mesh-shaped conductor can be easily fabricated in a thin film producing process performed in a liquid crystal display section 1.

When the anti-EMI filter layer is mounted outside of the liquid crystal display section 1, a problem of a moire stripe caused by pitch drifts arises.

However, in the LCD of the present invention, since the anti-EMI filter layer 8 is mounted within the liquid crystal display section 1, the anti-EMI filter layer 8 can be fabricated so as to have a position of the anti-EMI filter layer 8 be matched with the liquid crystal display section 1, which effectively serves for removing a moire stripe.

Twentieth Embodiment

Figure 12:
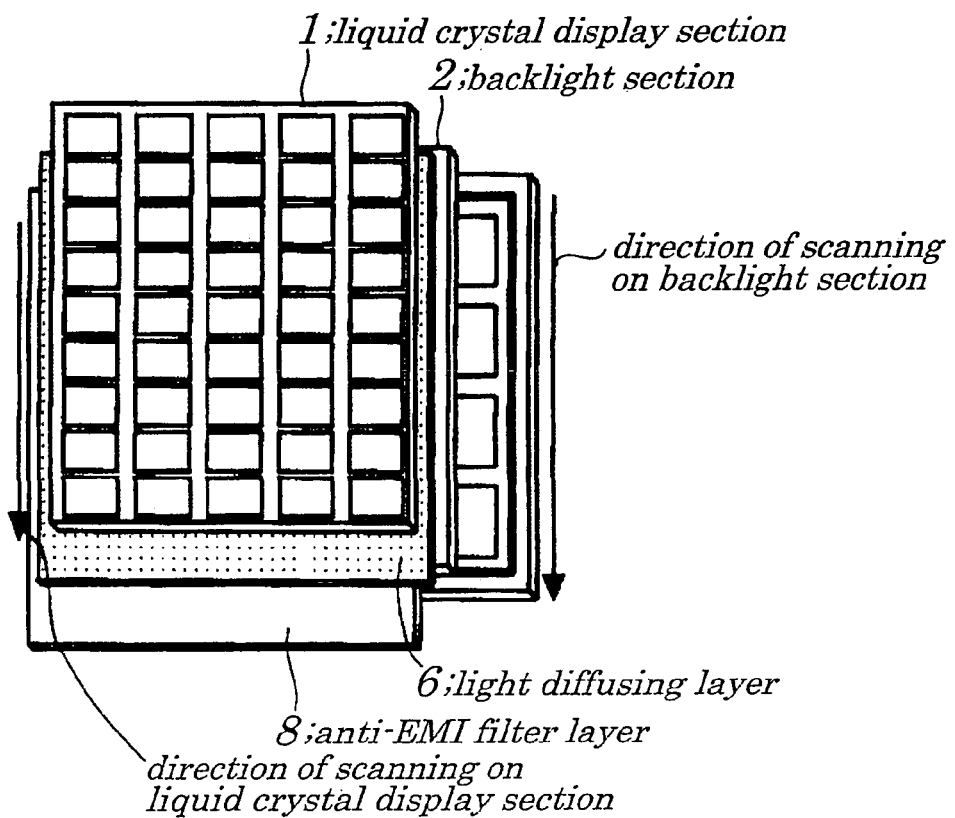
FIG. 12 is a diagram illustrating configurations of an LCD according to a twentieth embodiment of the present invention.

In an LCD of a twentieth embodiment, as shown in FIG. 12, at least, a backlight section 2, an anti-EMI filter layer 8, a light diffusing layer 6, and a liquid crystal display section 1 are provided in this order.

If the anti-EMI filter layer 8 is mounted outside of the liquid crystal display section 1, a moire stripe is produced by a mesh-shaped conductor of the anti-EMI filter layer 8 and by a liquid crystal display section 1. To avoid this, as shown in FIG. 12, the light diffusing layer 6 between them is placed, which effectively prevents occurrence of the moire stripe.

Twenty-First Embodiment

Figure 13:
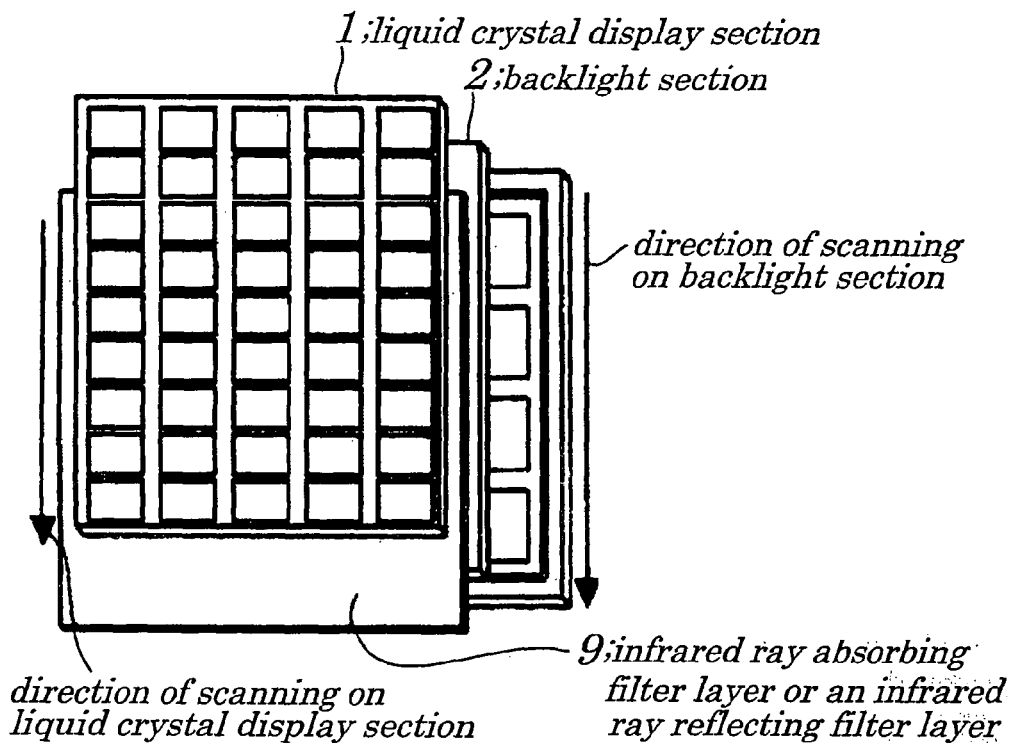
FIG. 13 is a diagram illustrating configurations of an LCD according to a twenty-first embodiment or the present invention.

In an LCD of a twenty-first embodiment of the present invention, as shown in FIG. 13, an infrared ray absorbing filter layer 9 or an infrared ray reflecting filter layer 9 is placed between a liquid crystal display section 1 and a backlight section 2.

Generally, an infrared ray is emitted, besides visible light, from a backlight section 2 at a same time. In some cases, this causes deterioration of the liquid crystal display section 1 or overheating phenomenon in the liquid crystal display section 1.

In the LCD of the embodiment, as shown in FIG. 13, the filter layer 9 absorbing or reflecting an infrared ray 9 is placed between the liquid crystal display section 1 and the backlight section 2. By configuring as above, the occurrence of overheat in the liquid crystal display section 1 is avoidable.

Twenty-Second Embodiment

In an LCD of the embodiment, a side at which there is placed a terminal portion of each of the plurality of scanning lines and the plurality of the signal lines in the liquid crystal display section are different from a side at which there placed a terminal portion of the plurality of the scanning electrodes in the backlight section 2.

Figure 14:
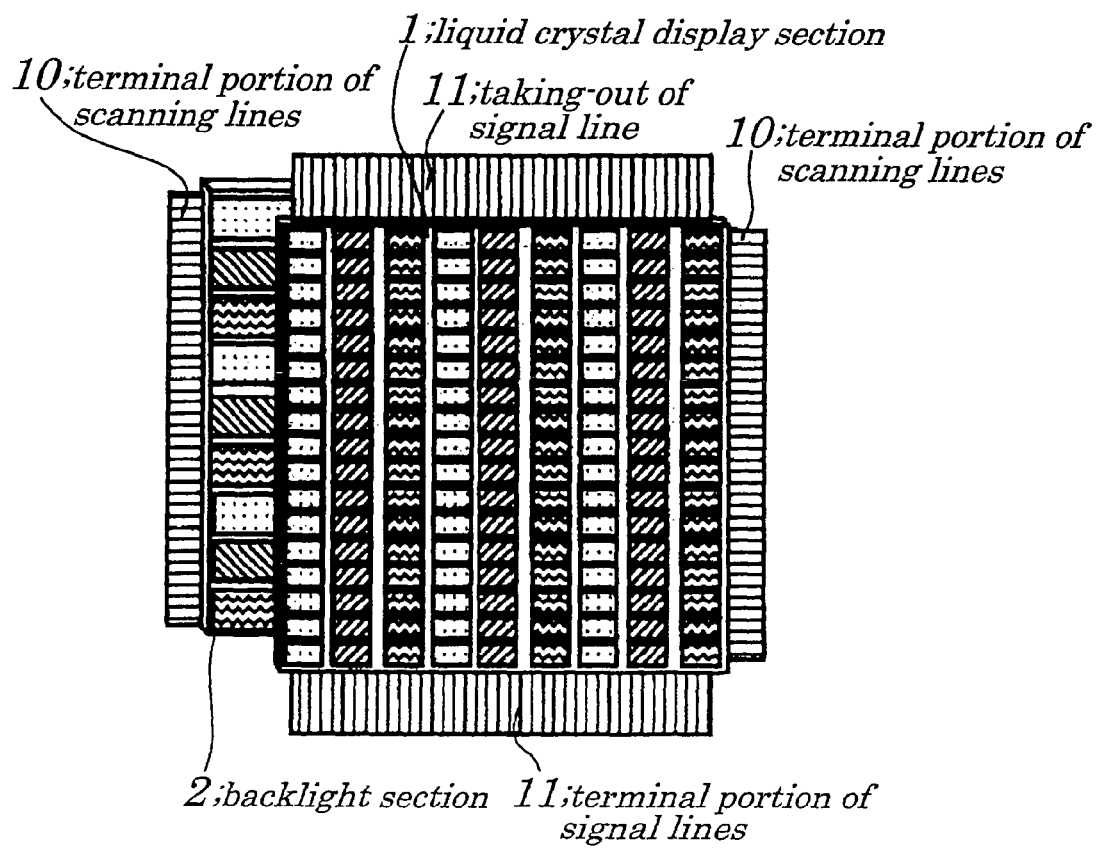
FIG. 14 is a diagram illustrating configurations of an LCD according to a twenty-second embodiment of the present invention.

FIG. 14 is a diagram illustrating configurations of the LCD according to the twenty-second embodiment of the present invention. By referring to FIG. 4, configurations of the LCD of the twenty-second embodiment are described.

In the liquid crystal display 1, a scanning line and a signal line have to be connected to an external circuit. Moreover, in the LCD of the embodiment, terminal portions taking out the scanning electrode line and common electrode line in the backlight section 2 is required. It is necessary that, by performing positioning and positional adjustment of both the lines, they are superimposed on each other. As a result, when compared with a conventional liquid crystal display device, more complicated taking-out of wires is required.

In the LCD of the embodiment, a scanning line of the liquid crystal display section 1 is taken from one side out of four sides of the liquid crystal display section 1 and a signal line is taken from other two sides out of the four sides and a scanning line of the backlight section 2 is arranged on a side except these three sides. This enables compact mounting.

Twenty-Third Embodiment

In the twenty-third embodiment as a backlight, a plane-type backlight is used in which gas is fed into a space between a first substrate and a second substrate and portions surrounding the space are sealed in a hermetic manner and wherein a common electrode is placed on the first substrate and a plurality of scanning electrodes is placed on the second substrate and a voltage is applied between electrodes to cause charging to occur in the space between the substrates and light is emitted from a fluorescent material placed between the substrates by excitation and wherein scanning mechanism to sequentially select the scanning electrode is provided.

Twenty-Fourth Embodiment

Figure 15:
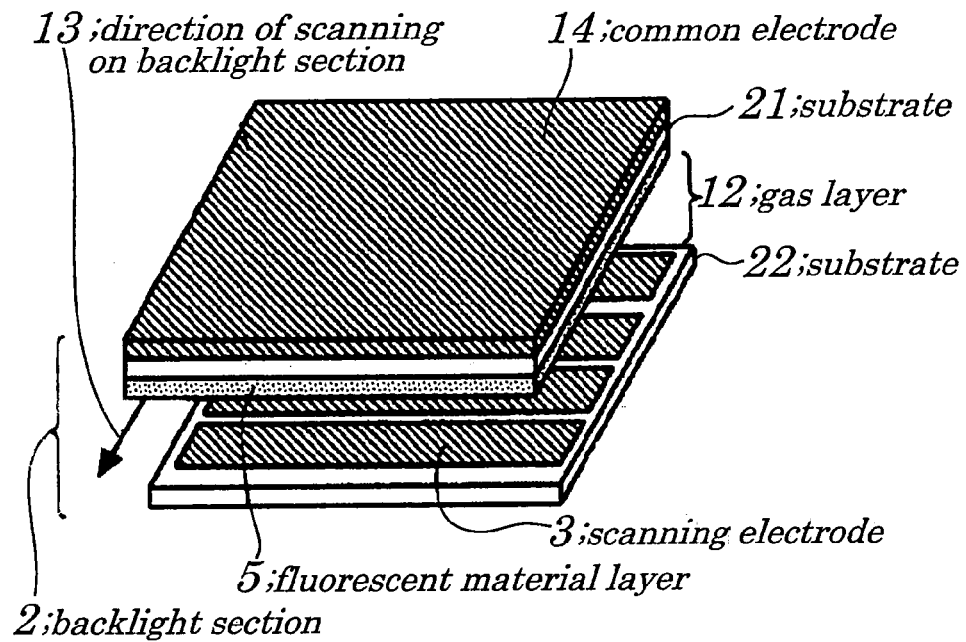
FIG. 15 is a diagram illustrating configurations of an LCD according to a twenty-fourth embodiment of the present invention.

In an LCD of a twenty-fourth embodiment, a backlight is an electrode formed so that common electrodes are at same potential on an entire light emitting face of a backlight. FIG. 15 is a diagram illustrating configurations of the LCD according to the twenty-fourth embodiment of the present invention. As shown in FIG. 15, in the embodiment, a common electrode 14 is placed so as to cover an entire surface of one substrate 21. On another substrate. 22 is formed a plurality of scanning electrodes 3 and on a side of the substrate 22 being opposite to the substrate 21 is provided a fluorescent light layer 5, which make up a backlight section 2. Moreover, in the example of FIG. 1, though the common electrode 14 is placed on an outside of a gas layer 12, the common electrode 14 may be fabricated on a side of the gas layer 12 of the substrate 21.

Twenty-Fifth Embodiment

Figure 16:
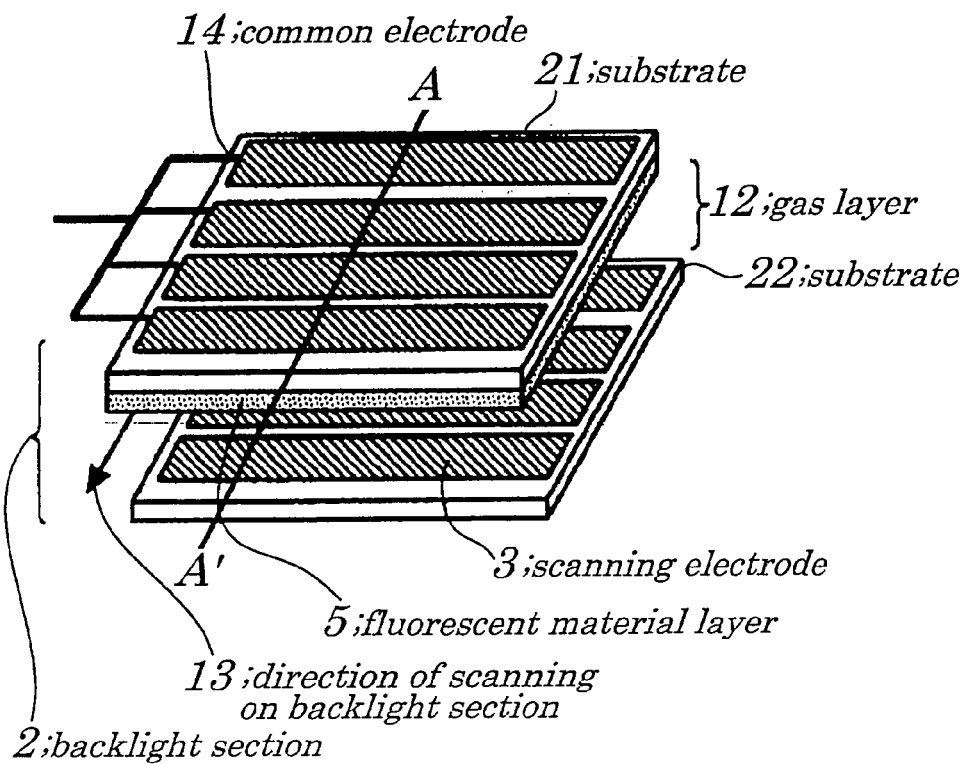
FIG. 16 is a diagram illustrating configurations of an LCD according to a twenty-fifth embodiment of the present invention.

In an LCD of a twenty-five embodiment, a backlight is made up of a plurality of belt-shaped common electrodes placed on one electrode and a plurality of belt-shaped scanning electrodes placed on another electrode wherein each of the common electrodes and each of the scanning electrodes are arranged in a same direction. FIG. 16 is a diagram illustrating configurations of the LCD according to the twenty-fifth embodiment of the present invention. As shown in FIG. 16, the plurality of common electrodes 14 on the substrate 21 is commonly connected to one another and are arranged in parallel. On a substrate 22 is arranged a plurality of scanning electrodes 3 in parallel.

Figure 17:
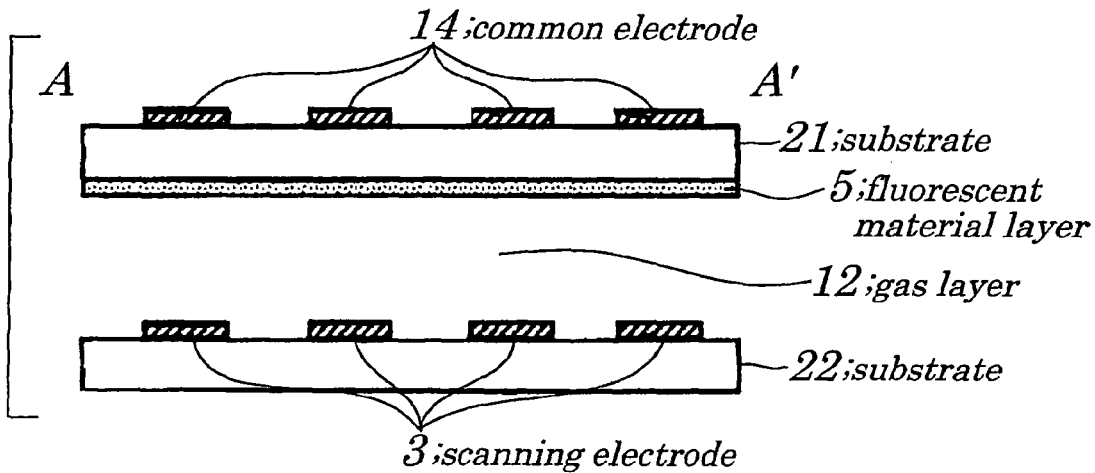
FIG. 17 is a diagram illustrating configurations of the LCD according to the twenty-fifth embodiment which is a cross-sectional view of the LCD of FIG. 16 taken along a line A-A'.

FIG. 17 is a diagram illustrating configurations of the LCD according to the twenty-fifth embodiment which is a cross-sectional view of the LCD of FIG. 16 taken along a line A-A'. The LCD of the twenty-fifth embodiment is provided with the substrate 21 having a plurality of the common electrodes 14 (belt-shaped electrode) arranged in parallel and the substrate 22 having a plurality of scanning electrodes 3 and wherein a fluorescent material layer 5 is placed on a face of the substrate 21 being opposite to the substrate 22 and a gas layer 12 is provided so as to be sandwiched between the substrates 21 and 22.

Figure 18:
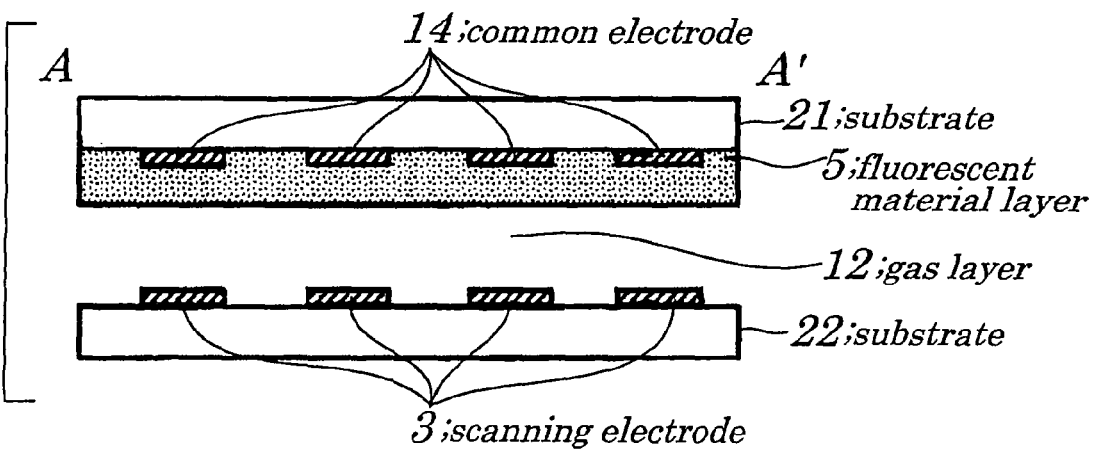
FIG. 18 is a diagram illustrating configurations of the LCD according to the twenty-fifth embodiment which is a dross-sectional view of the LCD of FIG. 16 taken along the line A-A'.
Figure 19:
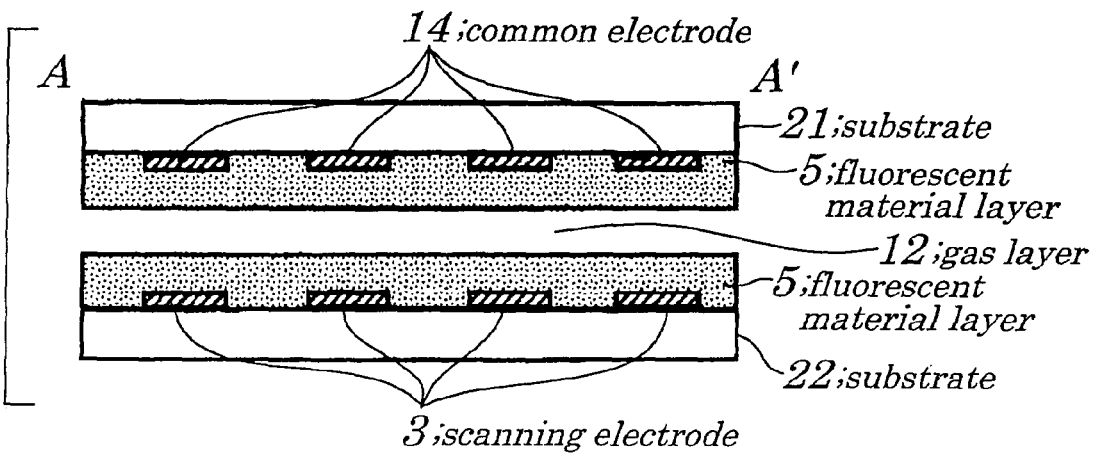
FIG. 19 is a diagram illustrating configurations of the LCD according to the twenty-fifth embodiment which is a cross-sectional view of the LCD of FIG. 16 taken along the line A-A'.

In the embodiment, modified LCDs as shown in FIG. 18 and FIG. 19 may be employed so long as it is so configured that the belt-shaped electrode can be driven for scanning.

As shown in FIG. 18, the modified LCD is provided with the substrate 22 having a plurality of scanning electrodes 3 and the substrate 21 having a plurality of common electrodes 14 (belt-shaped electrode) placed in parallel to one another on a face of the substrate 21 being opposite to the substrate 22 and wherein on a face of the substrate 21 being opposite to the substrate 22 is formed the fluorescent material layer 5 in a manner that it covers the common electrode 14 and a gas layer 12 is provided in space between the substrates 21 and 22.

As shown in FIG. 19, another modified LCD is provided with the substrate 22 having a plurality of scanning electrodes 3 and a fluorescent material layer 5 formed in a manner that it covers scanning electrodes 3 and the substrate 21 having common electrodes 14 (belt-shaped electrode) placed in parallel to one another on a face of the substrate 22 being opposite to the substrate 21 and wherein on a surface of the substrate 21 being opposite to the substrate 22 is formed the fluorescent material layer 5 in a manner that it covers the common substrate 14 and wherein the gas layer 12 is provided in space between the substrates 21 and 22.

Twenty-Sixth Embodiment

In an LCD of a twenty-six embodiment, common electrodes 14 are made up of a plurality of belt-shaped electrodes placed in one direction and scanning electrodes 3 are also made up of a plurality of belt-shaped electrodes placed in one direction and wherein both the common electrodes 14 and scanning electrodes 3 are deviated positionally from each other by a half period (a half pitch). In the LCD of the twenty-fourth embodiment, discharging in space between the scanning electrodes 3 does not occur easily.

Figure 20:
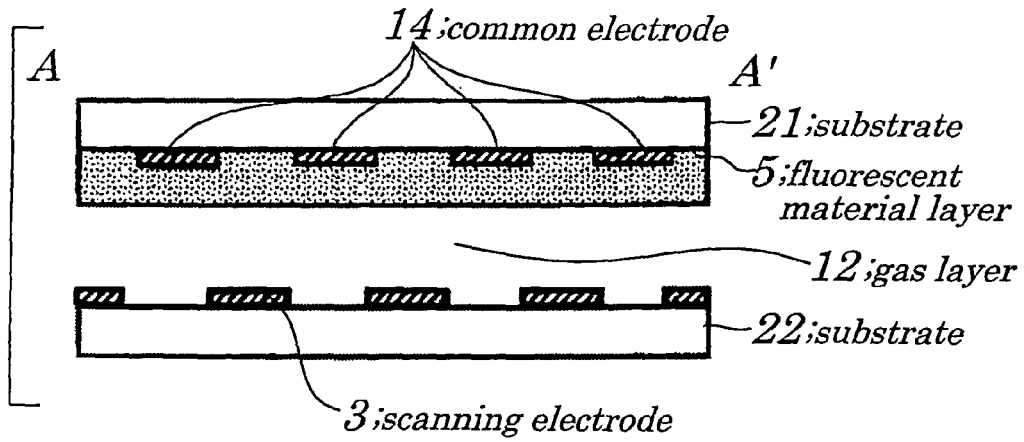
FIG. 20 is a cross-sectional view illustrating configurations of the LCD of the twenty-sixth embodiment of the present invention.

However, in the LCD of the twenty-sixth embodiment, as shown in FIG. 20, the common electrodes 14 and the scanning electrodes 3 are deviated positionally from each other by a half period (half pitch) and wherein the scanning electrodes 3 are formed in a position corresponding to a region in which the common electrodes 14 are not formed. The LCD of the twenty-sixth embodiment can be applied to the embodiments shown in FIG. 17 and FIG. 19.

Twenty-Seventh Embodiment

Figure 21:
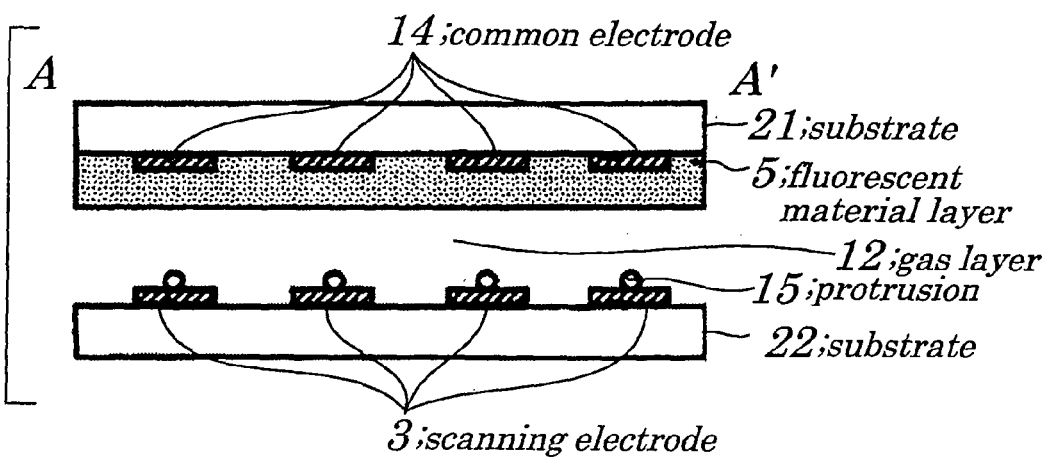
FIG. 21 is a cross-sectional view illustrating configurations of the LCD of a twenty-seventh embodiment of the present invention.

An LCD of a twenty-seventh embodiment has a protrusion 15 protruding toward discharging space on a dielectric layer formed at least on one side of a common electrode 14 or of a scanning electrode 3. FIG. 21 is a cross-sectional view illustrating configurations of the LCD of the twenty-seventh embodiment of the present invention. As shown in FIG. 21, the protrusion 15 is provided on a surface of a plurality of scanning electrodes 3 formed on a substrate 22.

By placing the protrusion 15 on a side of discharging space between electrodes facing each other, control can be exerted on a place where discharge as seeds is produced and on a place where intense discharging occurs, uniform and stable discharging can be achieved.

Same effects as obtained in the above embodiment can be obtained not only by mounting a discharging electrode on a dielectric layer being insulated from discharging space but also by mounting the protrusion 15 on an electrode being exposed in the discharging space and by covering the protruded electrode with the dielectric layer and by partially making smaller a thickness of the dielectric layer and by placing a protrusion on a surface of a fluorescent material.

Twenty-Eighth Embodiment

In an LCD of a twenty-eighth embodiment, both a common electrode 14 and a scanning electrode 13 are made up of a plurality of belt-shaped electrodes being placed in a same direction and each of the belt-shaped electrodes serves as a backlight corresponding to light having one of R, G, B colors.

Figure 22:
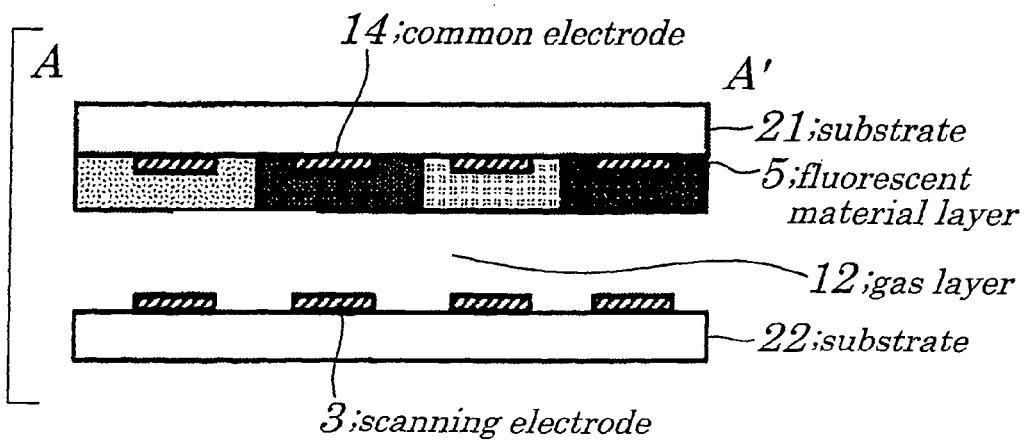
FIG. 22 is a cross-sectional view illustrating configurations of the LCD of a twenty-eighth embodiment of the present invention.

As shown in FIG. 22, by changing a color of a fluorescent material layer 5, a color of fluorescent light can be changed in a position of the scanning electrode 3 selected for scanning. In this case, scanning on each of the R, G, and B colors can be performed.

In the example shown in FIG. 22, the fluorescent material layer 5 is placed on a side of the common electrode 14, however, it may be placed on a side of the scanning electrode 3. Moreover, it may be placed on both the electrode substrates 3,14.

Twenty-Ninth Embodiment

In an LCD of a twenty-eighth embodiment, a common electrode 14 and a scanning electrode 3 are belt-shaped electrodes almost intersecting each other at right angles and each of the belt-shaped electrodes serves as a backlight corresponding to luminescent color out of R, G, B colors.

Figure 23:
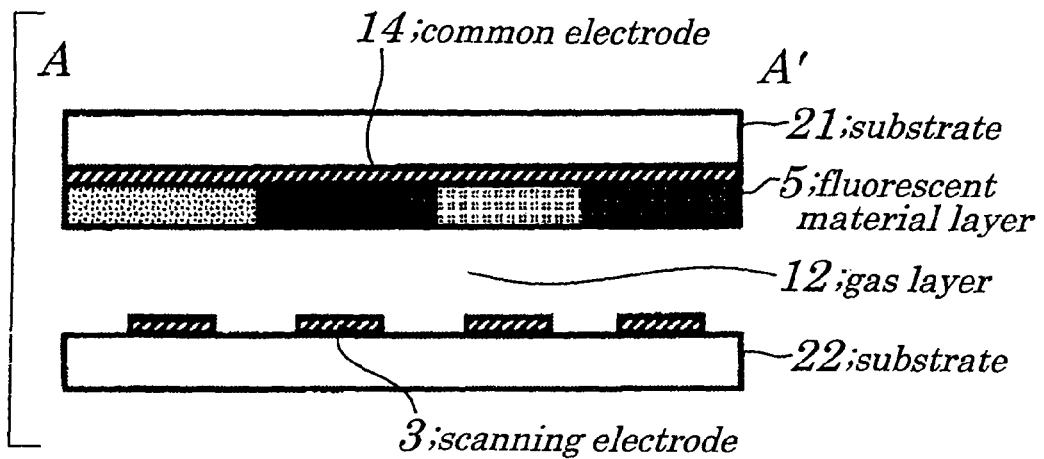
FIG. 23 is a cross-sectional view illustrating configurations of the LCD of a twenty-ninth embodiment of the present invention.

As shown in FIG. 23, in an LCD) of the twenty-ninth embodiment, both the common electrode 14 and the scanning electrode 3 are made up of belt-shaped electrodes intersecting at right angles each other (a series of belt-shaped electrodes placed in a horizontal direction). In this case, scanning can be performed on each of the colors R, G, and B.

Thirtieth Embodiment

Figure 24:
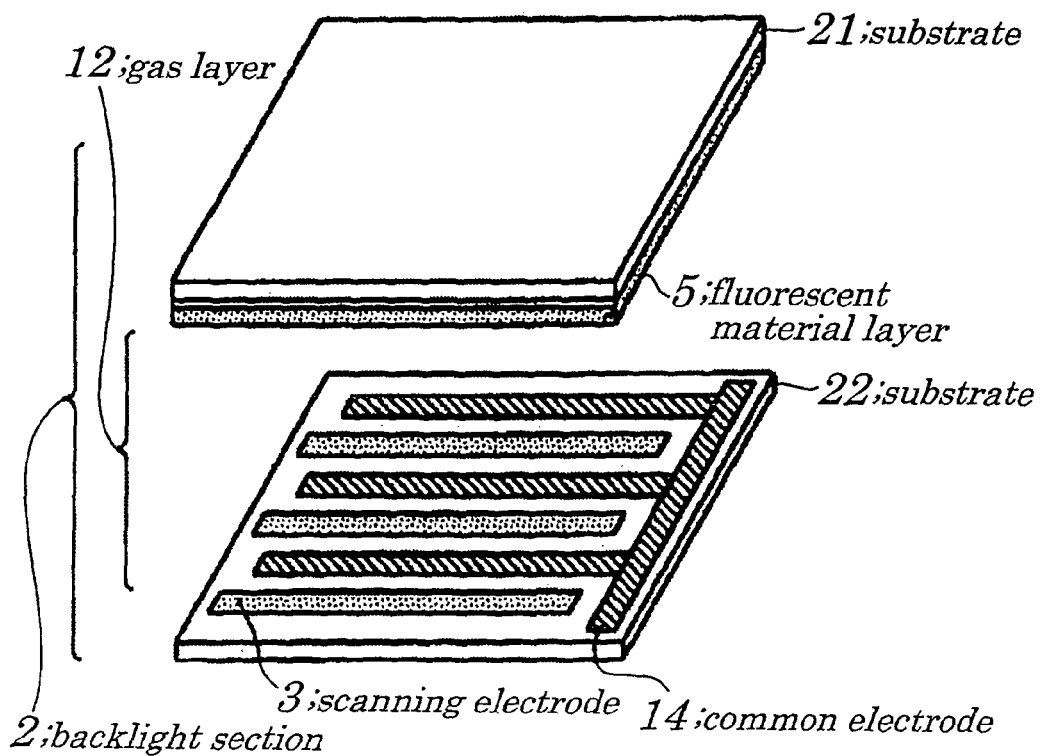
FIG. 24 is an exploded view illustrating configurations of an LCD of a thirtieth embodiment of the present invention.
Figure 25:
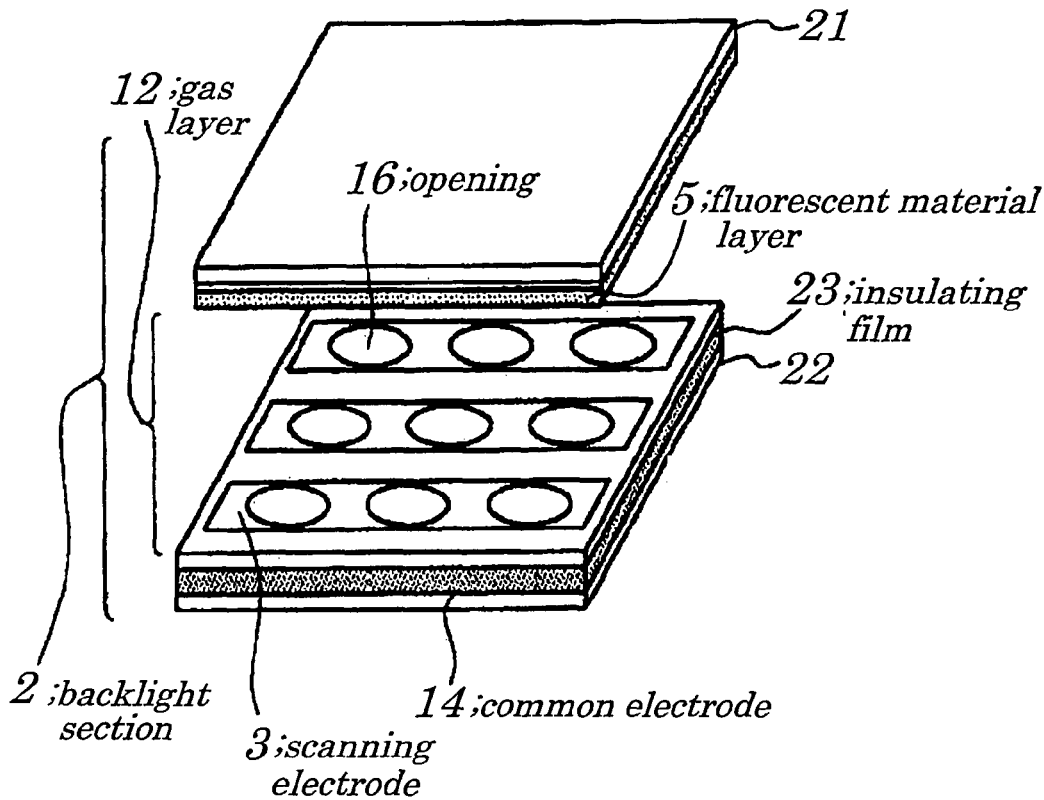
FIG. 25 is an exploded view illustrating configurations of a backlight of the thirtieth embodiment of the present invention.

As a backlight employed in a thirtieth embodiment, a plane-type backlight is used in which gas is fed into space between a first substrate and a second substrate and a portion surrounding the space filled with the gas is sealed in a hermetic manner in which a common electrode 14 and a plurality of scanning electrodes 3 are mounted on the first substrate and discharging occurs in space between the substrates by a voltage applied between electrodes and a fluorescent material arranged between the substrates is excited to emit light and in which the backlight has a scanning mechanism which sequentially selects a scanning electrode 3. FIGS. 24 and 25 are an exploded view illustrating configurations of the backlight of the embodiment.

In the example shown in FIG. 24, the common electrode 14 and the scanning electrode 3 are placed on a same substrate 22. The common electrode 14 is of a comb-teeth shape and between the common electrodes 14 are arranged belt-shaped scanning electrodes 3.

Moreover, in the example shown in FIG. 25, the common electrode 14 and the scanning electrode 3 are stacked in layers with an insulating film 23 sandwiched between the common electrode 14 and the scanning electrodes 3. To induce discharging, an opening 16 is formed on the scanning electrode 3 and the insulating film 23.

Thirty-First Embodiment

Figure 26:
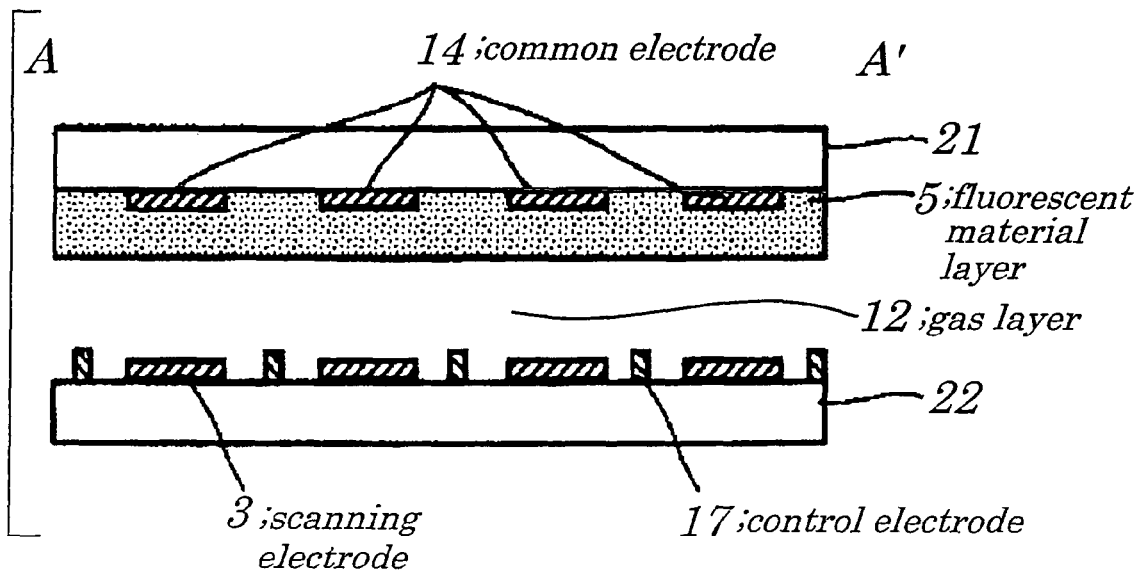
FIG. 26 is a cross-sectional view explaining configurations of a backlight of a thirty-first embodiment of the present invention.
Figure 27:
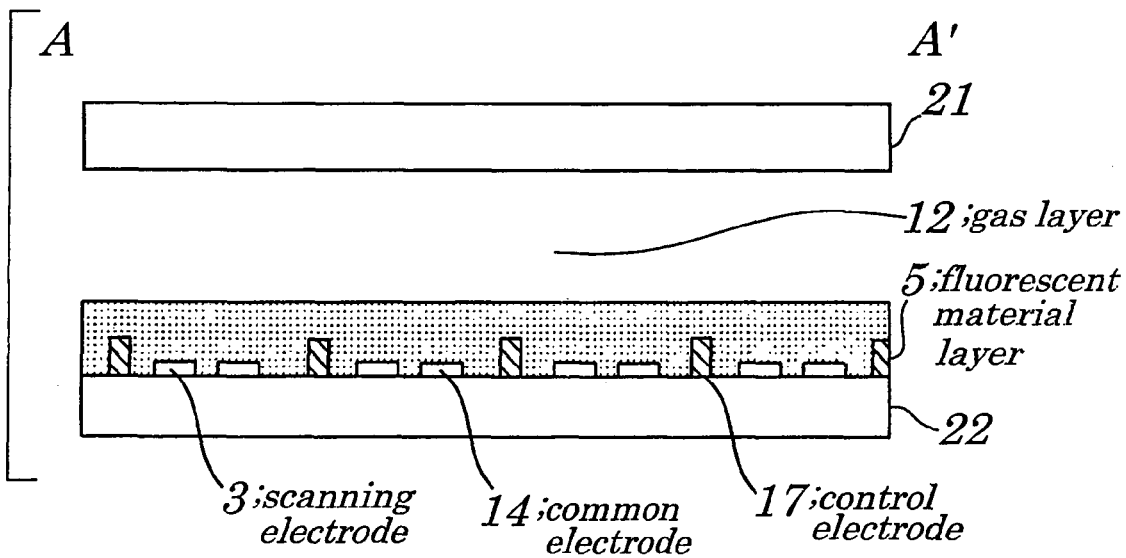
FIG. 27 is a cross-sectional view explaining configurations of the backlight of the thirty-first embodiment of the present invention.

In the backlight employed in a thirty-first embodiment, at least one of a common electrodes 14 and a scanning electrodes 13 are made up of a plurality of belt-shaped electrodes and among the belt-shaped electrodes is arranged an electrode which inhibits expansion of emitted light. FIGS. 26 and 27 are cross-sectional views explaining configurations of the backlight of the thirty-first embodiment of the present invention. Cutting plane lines A-A' in FIGS. 26 and 27 correspond to an A-A' line shown in FIG. 16. In the example shown in FIG. 26, the common electrodes 14 are placed on the substrate 21 and the scanning electrodes 3 on a substrate 22. In the example shown in FIG. 27, the common electrodes 14 and the scanning electrodes 3 are placed on a same substrate 22.

Discharging occurs between a pair made up of the common electrodes 14 and the scanning electrodes 3. A control electrode 17 is placed between the scanning electrodes 14. In the example in FIG. 26, another control electrode 17 is placed between the scanning electrodes 3 and the common electrodes 14 on the substrate 22. This prevents discharging between neighboring electrodes, thus enabling localization of discharging space.

In the example shown in FIG. 27, the scanning electrodes 3 and the common electrodes 14 are arranged in a same manner on the substrate 22 and the control electrode 17 is placed between a pair of the scanning electrodes 3 and a pair of the common electrodes 14. This prevents discharging between neighboring electrodes, thus enabling localization of discharging space. A fluorescent material layer 5 is formed in a manner so as to cover the scanning electrodes 3 and the common electrodes 14.

The configuration using the control electrode 17 shown in FIG. 26 can be applied to configurations of the electrode shown in FIGS. 15, 16, and 24. Moreover, the configuration using the control electrode 17, irrespective of arrangement of the fluorescent material, can be applied to configurations shown in FIGS. 1, 8, and 19.

Thirty-Second Embodiment

Figure 28:
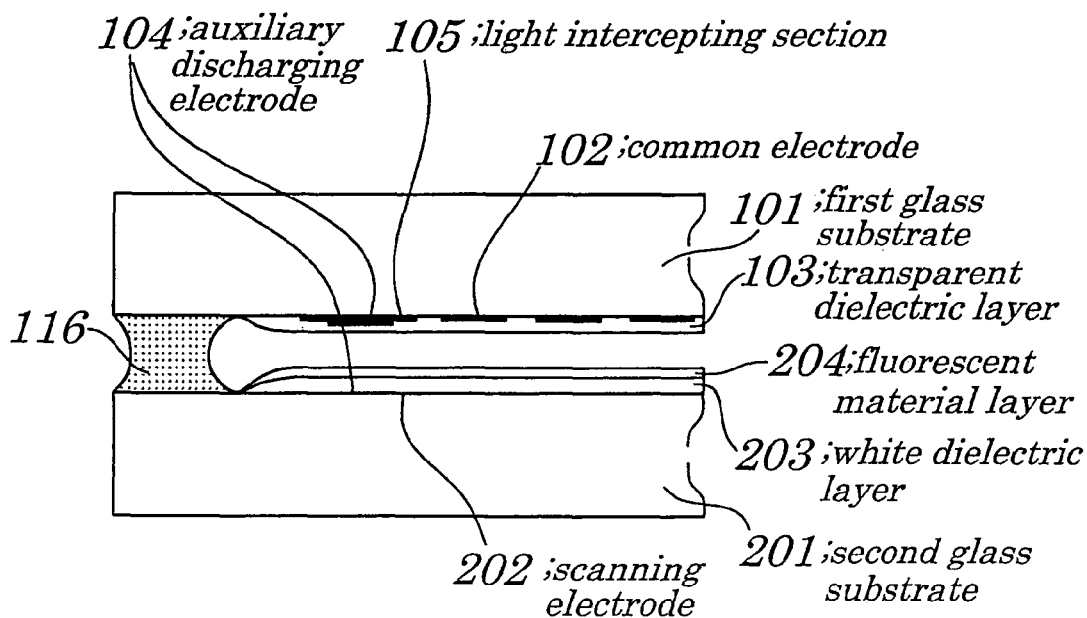
FIG. 28 is a cross-sectional view explaining configurations of a backlight of thirty-second to thirty-fourth embodiments of the present invention.

As a backlight employed in a thirty-second embodiment, as shown in FIG. 28, a discharging-type backlight is used which is placed adjacent to an outside of a display light emitting area in a discharging light emitting region in which a neighboring scanning line to start emitting of light for scanning does not emit light and which has an auxiliary discharging area to have discharging occur immediately before a start of emitting light for scanning. FIG. 28 shows a part of a cross-section in discharging light emitting region of the backlight having a first glass substrate 101 and a second glass substrate 201. On the first substrate 101 are placed a common electrode 102 and a transparent dielectric layer 103 and on the second substrate 201 are placed a scanning electrode 202, a white dielectric layer 203, and a fluorescent material layer 204. Moreover, in the auxiliary discharging area are provided an auxiliary discharging electrode 104 and a light intercepting section 105. A seal member 116 is also provided as shown in FIG. 22.

Thirty-Third Embodiment

A discharging-type backlight continues, all the time, discharging in an auxiliary discharging area during a period of emitting light for scanning and discharging.

In a head portion in which scanning is initiated, since time has elapsed after a previous discharging and since no discharging occurs in an neighboring scanning line, if there is no discharging in a surrounding area, discharging does not occur readily.

Next, as shown in FIG. 28, adjacent to a region being scanned of the above head portion is formed an auxiliary discharging region in which, by having discharging occur immediately before occurrence of discharging in the region being scanned of the head portion or by maintaining discharging continuously and supplying excited atoms and molecules, electrons, and ions serving as seeds of discharge (that is, by using a priming effect), it is possible to start discharging that rises in a stable and speedy manner, as in the case of discharging in other region being scanned.

Thirty-Fourth Embodiment

A discharging-type of a thirty-fourth embodiment, as shown in FIG. 28, is so configured that an area of an auxiliary discharging electrode 104 used to have discharging occur in an auxiliary discharging area is smaller than that of an scanning electrode 202 used to emit light for scanning and discharging or that a thickness of a dielectric material layer used to coat an auxiliary discharging electrode 104 is larger than that of a dielectric material layer used to coat an electrode to emit light for scanning and discharging.

Thirty-Fifth Embodiment in a discharging-type backlight to be used for a liquid crystal display device, a fluorescent material is not placed in an area surrounding an auxiliary discharging region. It is preferable that intensity of discharging occurring in the auxiliary discharging area is as small as possible. Therefore, by making an area of an electrode used to have auxiliary discharging occur be narrower than that of a scanning electrode or by making a thickness of a dielectric material layer covering an electrode be larger than that of a scanning section, the intensity of the auxiliary discharging can be properly controlled without reducing a priming effect.

Figure 29:
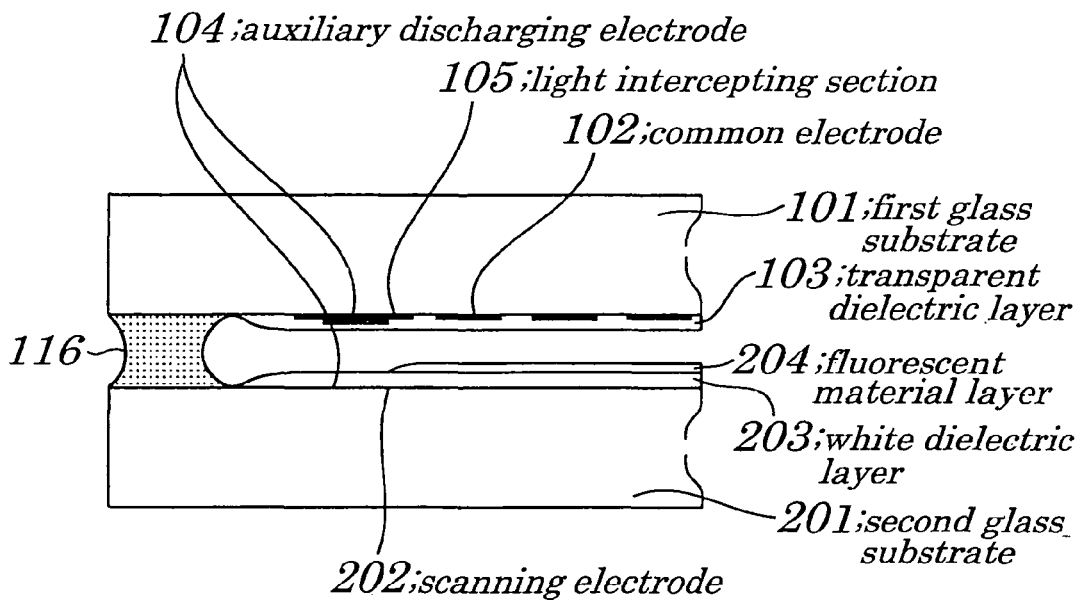
FIG. 29 is a cross-sectional view explaining configurations of a backlight of a thirty-fifth embodiment of the present invention.

As shown in FIG. 29, by configuring the backlight so that a fluorescent material layer 204 is not placed in an auxiliary discharging region, it is possible to prevent light from a fluorescent material layer emitted by auxiliary discharging from turning around a region being scanned or around a displaying region.

Thirty-Sixth Embodiment

Figure 30:
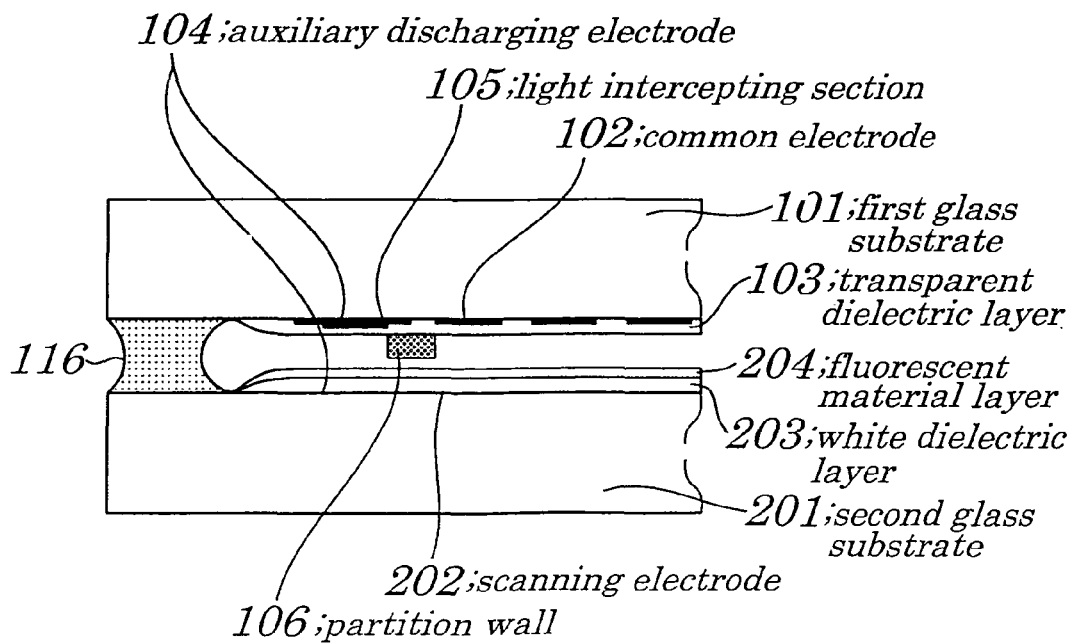
FIG. 30 is a cross-sectional view explaining configurations of a backlight of a thirty-sixth embodiment of the present invention.

In a discharging-type backlight to be used for a liquid crystal display device, a partition wall 106 to reduce invasion of discharging light into a region of light emitting for discharging and scanning in a region in which discharging is maintained continuously (see FIG. 30) is placed outside of a discharging light emitting region in which discharging is started. FIG. 30 is a cross-sectional view explaining configurations of the backlight of the thirty-sixth embodiment. As shown in FIG. 30, by separating an auxiliary discharging region from a region being scanned using a shielding structure such as the partition wall 106 in a range in which a priming effect can be obtained, it is possible to reduce a detriment that a fluorescent material in the region being scanned excited by ultraviolet rays produced by an auxiliary discharge, whereby fluorescent light is emitted from the fluorescent material.

Thirty-Seventh and Thirty-Eighth Embodiments

In a discharging-type backlight employed in the thirty-seventh and thirty-eighth embodiments, a region in which scanning light emission is initiated is placed outside of a discharging region. A discharging electrode to initiate scanning light emission is placed outside of the discharging region.

When a region in which the scanning light emission is initiated is matched with a displaying region without redundancy, due to a special characteristic of a head portion of light for scanning, a characteristic of the light emitted in this region is different from that in other regions.

Figure 31:
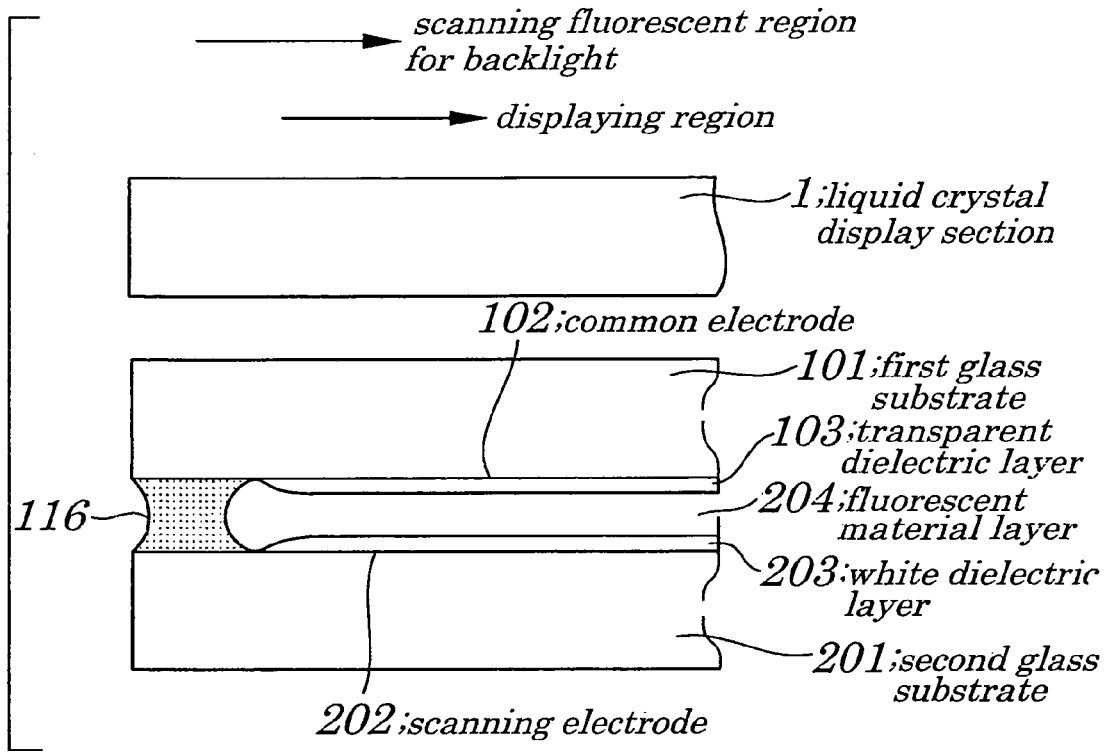
FIG. 31 is a cross-sectional view explaining configurations of a backlight of thirty-seventh and thirty-eighth embodiments of the present invention.

As shown in FIG. 31, by using a scanning light emitting region being larger than a displaying region, light emitted for discharging in a head portion of light for scanning is not used for displaying and only a region of light emitting for scanning providing a uniform and stable state can be used and therefore stabilization of displaying and high image quality can be obtained. Such a configuration can be achieved by placing a scanning and discharging electrode outside of a displaying region.

Thirty-Ninth Embodiment

Figure 32:
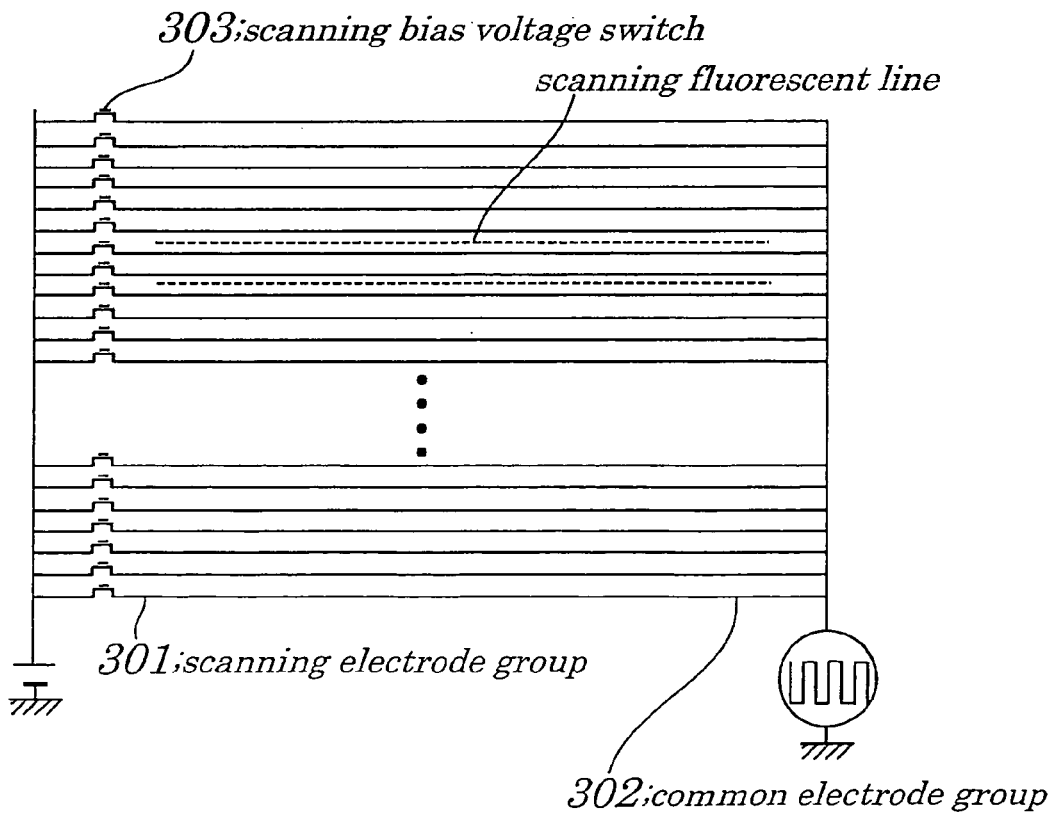
FIG. 32 is a diagram explaining wires for electrodes employed in a thirty-ninth embodiment of the present invention.

A method for driving a discharging-type backlight employed in a thirty-ninth embodiment in which an electrode at least one end of which is covered by a dielectric is placed on a first and second glass substrate 201, gas is fed into a space being provided between the first glass substrate 101, a portion surrounding the space is sealed, discharging occurs in the space between the first glass substrate 101 by application of a voltage and light is emitted by exciting a fluorescent material being arranged between the substrates, includes a step of constructing at least one electrode to have the above discharging occur by using a plurality of belt-shaped electrodes, of applying a DC (direct current) voltage to one electrode out of the belt-shaped electrodes during light emission for scanning and-discharging in a region in which the belt-shaped electrode emits light for discharging and of applying a sine waveform voltage or a rectangular waveform voltage to other electrode. FIG. 32 is a diagram explaining wires for electrodes of a thirty-ninth embodiment of the present invention. As shown in FIG. 32, a scanning bias voltage is fed to a scanning electrode group 301 being connected to a scanning bias voltage switch 303 being in an ON state and a common signal (alternating voltage) is input to a common electrode group 302.

By changing a potential in an electrode to which a DC voltage is applied corresponding to an intermediate potential of an alternating voltage to be applied to other electrode, an amplitude of the alternating voltage at each polarity to be applied to the electrode to which the DC voltage has been applied can be varied.

Discharging occurs by application of an alternating voltage of several MHz or less between electrodes at least one end of which is covered by a dielectric. The discharging occurs when the alternating voltage exceeds a threshold voltage and has a dielectric bear electrical charges so as to generate a voltage having a reverse polarity between electrodes and is terminated.

A subsequent alternating voltage applied from an outside is superimposed on a voltage produced by charging with electricity, which causes occurrence of a subsequent discharging and a voltage having a reverse polarity to be generated between electrodes and the discharging is terminated.

Fortieth Embodiment

Figure 33:
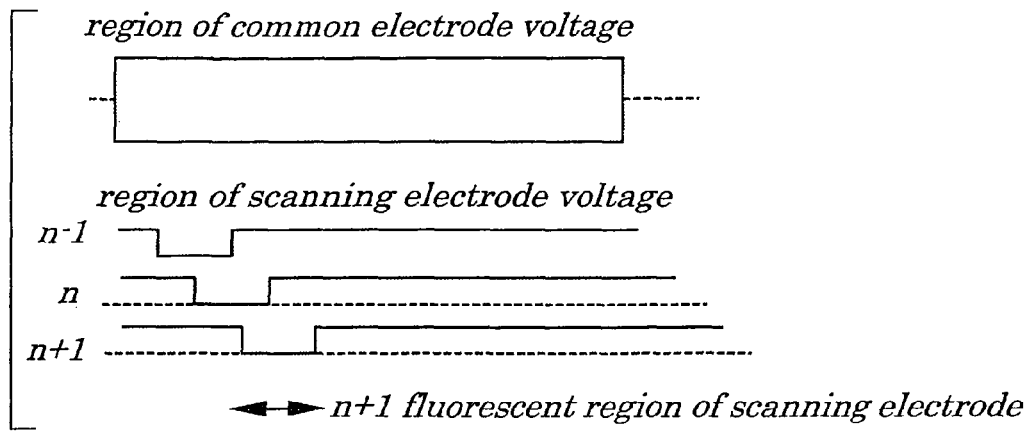
FIG. 33 is a diagram illustrating a waveform of a driving voltage employed in a fortieth embodiment of the present invention.

In a method for driving a backlight for an LCD which scans a region of light emitting for discharging, a DC voltage to be applied to a belt-shaped electrode is scanned. FIG. 33 is a diagram illustrating a waveform of a driving voltage employed in the fortieth embodiment of the present invention.

Discharging continues in a stable state when a potential in an electrode (for example, scanning electrode) to which a DC voltage is applied is at an intermediate potential of an alternating voltage applied to other electrode (for example, common electrode). By applying a DC voltage in a manner that the applied voltage is drifted from the intermediate potential of the alternating voltage to other electrode, it is made possible that a threshold voltage is not exceeded even if a superimposing voltage by charging with electricity is contained.

Thus, a discharging occurring region can be controlled by changing a DC voltage. By scanning a DC voltage to be applied to a belt-shaped electrode of the scanning electrode with an amplitude of an alternating voltage maintained at a constant level using the above discharging control mechanism, scanning can be performed on a region of light emitting for discharging.

Forty-First Embodiment

In a method for driving a backlight for an LCD, intensity of light emitted for scanning and discharging is varied by changing a DC voltage to be applied to a belt-shaped electrode.

Figure 34:
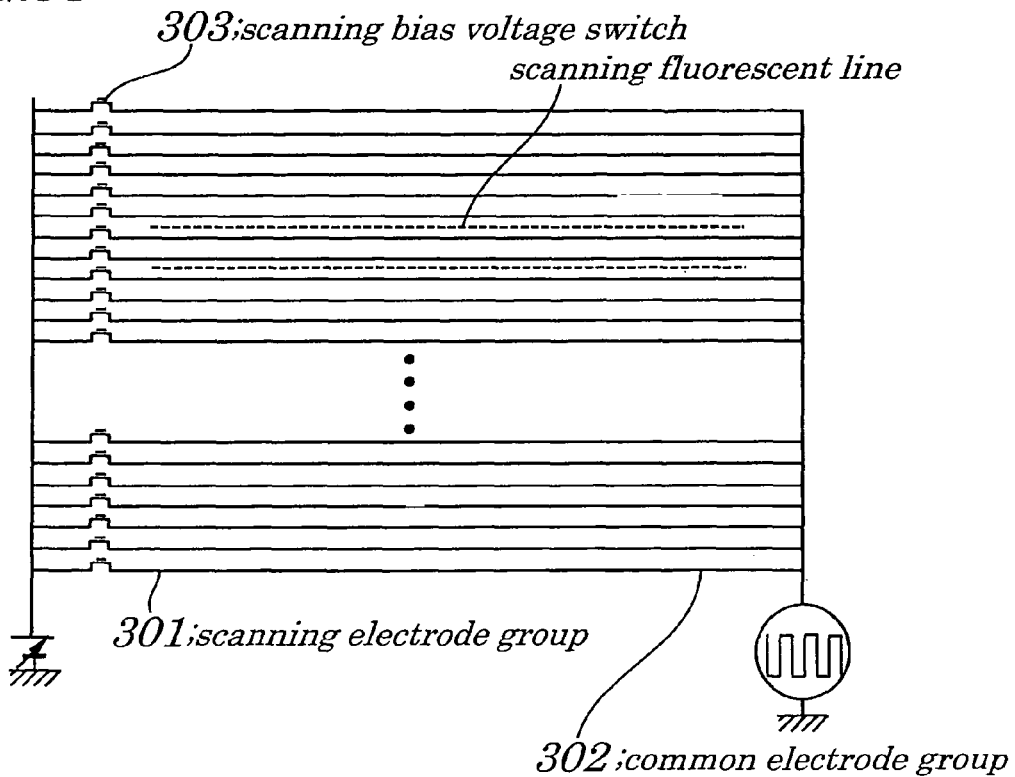
FIG. 34 is a cross-sectional view showing a backlight of a forty-first embodiment of the present invention.

FIG. 34 is a cross-sectional view showing a backlight of a forty-first embodiment of the present invention. By setting a DC voltage so as to be drifted from an intermediate potential within a range in which discharging occurs, it is possible to change the intensity of light emitted for scanning and discharging, that is, average luminance of light fed from the backlight. A DC voltage to be supplied to a scanning electrode group 301 through a scanning bias voltage switch 303 is made variable.

Forty-Second Embodiment

In a method for driving a backlight of a forty-second embodiment, a width of a region of light emitting for scanning is varied by changing a number of belt-shaped electrodes to which a DC voltage is applied. By changing a number of the belt-shaped electrode to which a DC voltage is applied, it is made possible to change a width of the region of light emitted for scanning and to change average luminance of light fed from the backlight.

Forty-Third Embodiment

In a method for driving a backlight of a forty-third embodiment, by changing a frequency of an alternating voltage to be applied to one electrode, luminance of light fed from the backlight is changed. Since an alternating voltage is applied only to the one electrode by employing the method of the forty-third embodiment, a frequency can be changed easily and independently without an influence on other characteristics and calibration of luminance of light fed from the backlight can be easily made.

Forty-Fourth Embodiment

An LCD of a forty-fourth embodiment is provided with a liquid crystal display section and a discharging-type backlight having characteristics described in above other embodiments and scanning is performed on the backlight and the liquid crystal display section in a same period.

Forty-Fifth Embodiment

Figure 36A:
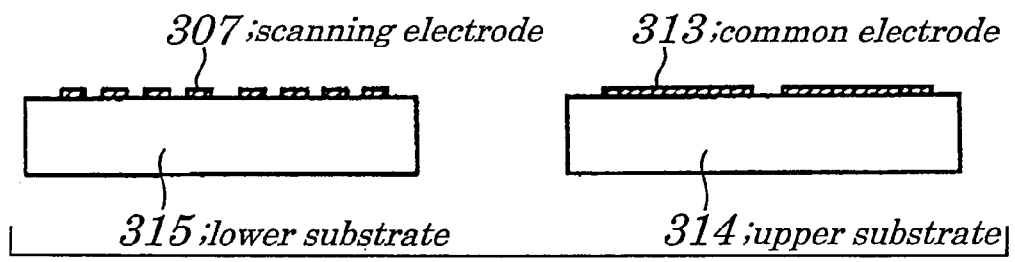
FIGS. 36A to 36F are cross-sectional views explaining manufacturing processes of a backlight of a forty-fifth embodiment of the present invention.
Figure 36B:
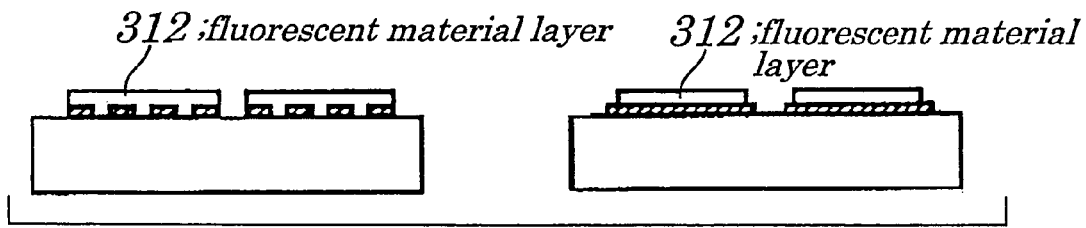

In a method for manufacturing a backlight section employed in a forty-fifth embodiment, a plurality of backlight units is manufactured collectively, as shown in FIGS. 36A and 36B, by forming unit portions of a plurality of backlight units having scanning electrodes 307, a common electrode 313, a dielectric layer, and a fluorescent layer 312 making up a discharging-type backlight on either of two substrates an upper substrate 314 and a lower substrate 315, by forming a sealing layer in a manner that it surrounds a region in which discharging occurs in this unit portion and then feeding gas into each unit portions obtained by bonding and cutting the upper substrate 314 and the lower substrate 315 or by feeding gas into a substrate obtained by bonding two substrates together and then by cutting the bonded substrate.

FIG. 36 is a cross-sectional view explaining manufacturing processes of the backlight of the forty-fifth embodiment of the present invention.

As shown in FIG. 36A, the scanning electrode 307 is formed on the lower substrate 315 and a common electrode 313 is formed on the upper substrate 314. As shown in FIG. 368, the fluorescent layer 312 is formed.

Figure 36C:
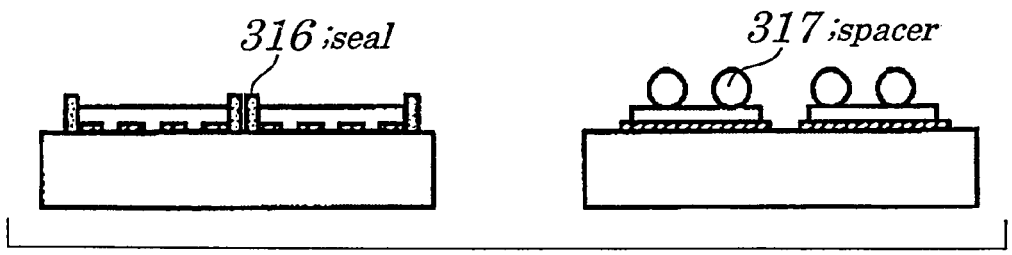

As shown in FIG. 36C, a seal member 316 is mounted on the lower substrate 315 and a spacer 317 (for example, glass-like spacer) on the upper substrate 314 Thus, a plurality of unit portions of the backlight is prepared. In the example shown in FIGS. 36A to 36F, a plurality of scanning electrodes 307 and one common electrode 313 are mounted in each unit portion.

Figure 36D:
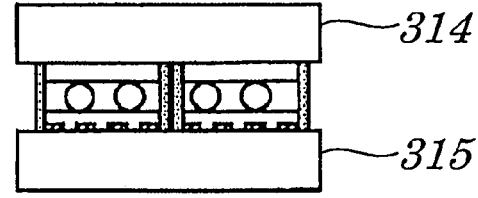

Then, as shown in FIG. 36D, the upper substrate 314 and the lower substrate 315 are stuck.

Figure 36E:
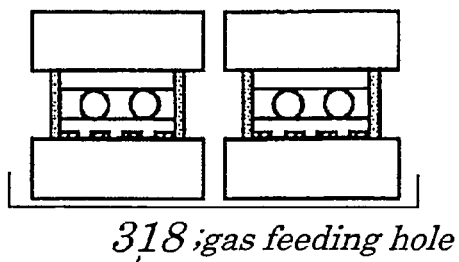

Next, as shown in FIG. 36E, each of the unit portion is cut for separation.

Figure 36F:
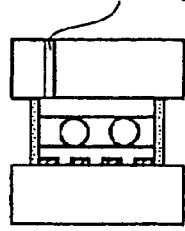

Then, as shown in FIG. 36F, gas is fed through a gas feeding hole 318 in a hermetic manner. An alternative method is that after the two substrates have been stuck and inert gas has been fed therein/cutting is made in each of unit portions.

Moreover, each of the unit portions is connected to a scanning driving system of the backlight section. Then, positional calibration relative to a liquid crystal display section 1 is made to achieve arrangement in stacked layers.

At this point, connection is established so that the scanning driving system of the backlight section synchronizes with that of the liquid crystal display section 1. By operating above, by performing one time assembling process, a plurality of backlight sections can be obtained. This enables an LCD in which scanning by the liquid crystal display section is synchronized with scanning by the backlight section to be provided at low costs.

EXAMPLE

Figure 35:
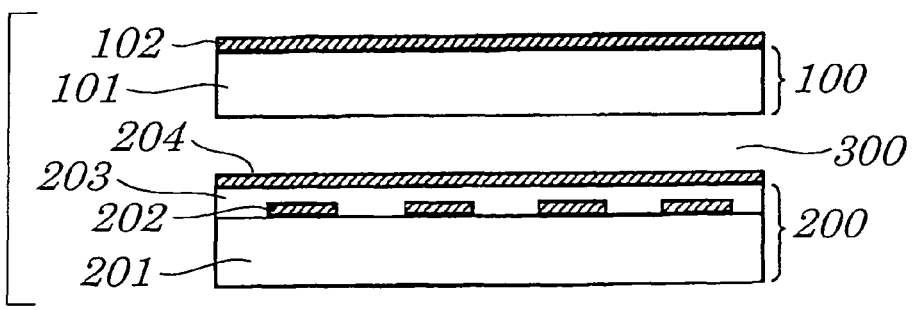
FIG. 35 is a cross sectional view schematically illustrating basic configurations of a gas discharging-type backlight of the embodiment of present invention.

An example of the present invention will be described below. FIG. 35 is a cross-sectional view schematically illustrating basic configurations of a gas discharging-type backlight used in the present invention. In FIG. 35, in the backlight of the example of the present invention, a common electrode 102 made up of a transparent conductive film made by using an indium oxide or tin oxide as a main ingredient is formed on an entire surface of a displaying region of a first glass substrate 101. The first glass substrate 101 and the common electrode 102 make up a front glass substrate 100.

On a second glass substrate 201 is formed, in order to control a region of emitted light, short-book shaped scanning electrodes 202 fabricated by using a metal thin film or metal particles as a main ingredient which are arranged in parallel in a direction traveling straight to a scanning direction or a metal fine particle, on which a white dielectric layer 203 is formed and finally a fluorescent material layer 204 to emit light by being excited using ultraviolet rays is formed. The second glass substrate 201, the scanning electrode 202, the dielectric layer 203, and the fluorescent material layer 204 make up a rear substrate 200.

In the example, the fluorescent material layer 204 is made up of a three-waveform light emitting fluorescent material so that visible light fed from the fluorescent material layer 204 can be suitably applied to a color filter in a liquid crystal section and light having a white color is emitted.

The front glass substrate 100 and the rear glass substrate 200 are stuck to each other with a spherical glass spacer sandwiched between the font glass substrate 10 and the rear glass substrate 200 in a manner that an interval between the front glass substrate 100 and the rear glass substrate 200 making up a discharging space 300 is kept at a constant length. The discharging space 300 is filled with gas containing an inert gas as a main ingredient by using frit glass in a portion surrounding a backlight in a hermetic manner.

In the above example, the common electrode 102 is formed on an entire surface being opposite to the discharging space 360 existing on the first glass substrate 101.

The common electrode 102 may be formed on a side of the discharging space 300 or may be formed in a same direction as arrangement of the scanning electrode 202 or in a direction orthogonal to the scanning electrode 202 in a short-book, form.

These configurations are possible so long as discharging occurs by a voltage being applied between the common electrode 102 and the scanning electrode 202 and a discharging current is limited by a dielectric layer being placed between electrodes or by a glass substrate before a breakdown of the dielectric layer occurs (this operation being called "dielectric barrier discharging".

Moreover, it is necessary that electrodes being placed on a side of a displaying face, irrespective of whether it is the common electrode 102 or the scanning electrode 202, are so configured as to fully pass visible light fed from a fluorescent material and therefore the electrodes existing on a side of the displaying face are made of a transparent conductive material, a metal mesh, or a like.

The scanning electrode 202 or the white dielectric layer 203 is constructed of materials that can effectively guide light fed from a fluorescent material to a side of the displaying face it is desirous that the white dielectric layer 203 contains fine particles with a high refractive index such as titanium oxide and the scanning electrode 202 is constructed of materials with a high rate of reflection for visible light such as silver, aluminum, or a like.

In a case where the scanning electrode 202 on a side of the rear substrate 200 is formed on an entire surface of a displaying region in a plane form, instead of the white dielectric layer 203, a transparent dielectric layer may be used.

Moreover, the scanning electrode 202, if being of a short-book shape, may be so configured that no dielectric layer is mounted on a metal electrode or that a transparent dielectric layer is formed or that a white dielectric layer is formed in a region where no metal portion between electrodes is formed.

The fluorescent material layer 204 may be formed not only on the rear substrate 200 but also on the front substrate 100 on the displaying face.

Also, the fluorescent material layer 204 may be constructed of not a visible light emitting fluorescent layer but an ultraviolet ray emitting fluorescent material or may be so configured that ultraviolet rays being generated by discharge in a gas are taken out as light fed from the backlight and ate used for scanning.

Next, an example of a method for manufacturing the discharging-type backlight is described below.

The common electrode 102 is fabricated by forming a transparent conductive film containing indium oxide as a main ingredient on a front surface of the first glass substrate 101 and by performing patterning on the resulting transparent conductive film by etching technique using a photoresist.

The (patterned) common electrode 102 has an electrode portion section outside of the displaying region.

The common electrode 102 is placed in a manner that it is not exposed in the discharging space 300 at least in the displaying region and is fabricated by forming a dielectric paste containing a material with a low melting point as a main ingredient by using a screen printing method and by coating a baked transparent dielectric layer with the dielectric paste.

On the other hand, on the second glass substrate 201 is formed the scanning electrode 202 fabricated by performing patterning on a conductive paste containing Ag (silver) particles as a main ingredient by using the screen printing method and by coating the second glass substrate 201 with the obtained conductive paste and by baking the coated substrate.

The scanning electrode 202 also has an electrode portion section outside of the displaying region.

The scanning electrode 202 is placed in such a manner that it is exposed in the discharging space 300 at least in the displaying region and is fabricated by being coated with the white dielectric layer 203 obtained by forming a dielectric paste containing glass with a low melting point made of white pigment fine particles using the screen printing method and by baking the obtained dielectric paste.

On the white dielectric layer 203 is formed a three-waveform light emitting fluorescent material by a screen printing method which is then baked and is used as the fluorescent material layer 204.

Then, a frit glass paste is formed by being discharged in a closed line form by a dispenser in a portion surrounding an outside of the displaying region of the first glass substrate 101 and the second glass substrate 201 and the formed frit glass paste is pre-baked.

On the rear glass substrate 201 are formed a hole for introducing gas and an exhaust tube made up of a glass tube.

A backlight panel is fabricated by placing glass balls for a spacer each having a diameter of 0.1 mm to 2 mm between the first glass substrate 101 and the second glass substrate 201 and by performing positioning on the glass balls, by baking and bonding them together.

In order to prevent movement of the glass spacer obtained by a sealing process, it is desirous that a concave and convex portion having a length of several to several tens μm in a portion in which the above transparent dielectric layer or the white dielectric layer 203 comes into contact with the glass spacer.

Gas in the above stuck backlight is exhausted through an exhaust tube until a vacuum is produced and, at the same time, the backlight panel is heated so as to promptly exhaust the atmospheric gas being left in the backlight panel.

After sufficient heating and exhausting, a temperature in the backlight panel is lowered and Xe (xenon) gas is fed into the discharging space 300 in the backlight panel at a pressure of 600 hPa in a hermetic manner and then the exhausting tube is closed.

As a discharging gas, besides the Xe (Xenon) gas, a pure gas of Ar (Argon), Kr (krypton), or N (nitrogen), or a mixed gas of inert gases including He (Helium) or Ne (Neon) with these gases can be used. Gas composition and a thickness of the dielectric material layer can be calibrated in such a manner that luminance of emitted light and driving voltage are optimized.

Next, a method of scanning and driving by the discharging-type backlight employed in the embodiment is described, As shown in FIG. 33, a voltage having a sine wave or a rectangular wave of several kHz to several tens MHz is applied to the common electrode 102.

Also, as shown in FIG. 33, to the scanning electrode 202 which does not emit light for discharging is applied a voltage being drifted from an intermediate voltage of an alternating voltage being applied to the common electrode 102.

To the scanning electrode 202 that emits light for discharging is applied a voltage being approximately an intermediate voltage of an alternating voltage being applied to the common electrode 102.

In a region where a voltage of the scanning electrode 202, a surface on a side of the discharging space 300 of the dielectric material layer existing between the common electrode 102 and the scanning electrode 202 is charged with electricity and discharging is terminated once. However, reverse-polarity discharging occurs by a voltage, being applied immediately, having a reverse polarity in the common electrode 102 and the discharging is maintained by repetition of these operations.

On the other hand, when a voltage of the scanning electrode 202 is drifted largely from an intermediate voltage of the common electrode 102, if discharging occurs by a large potential difference and is terminated by charging with electricity once, a potential difference is small at a subsequent voltage having a reverse polarity and continuous discharging can be avoided.

Moreover, by a voltage being applied to the scanning electrode 202, luminance of emitted light can be changed.

By having a voltage to be applied to the scanning electrode 202 be scanned for every single scanning line or every two or more scanning line blocks, light can be emitted while a scanning line to emit light is being selected.

Modulation of a voltage to be fed to the scanning electrode 202 can be performed at a high speed by a switch fabricated by using, for example, an FET (Field Effect Transistor).

Next, configurations and driving methods for more improving characteristics of scanning light emission in the backlight for scanning of the present invention are described.

When such the scanning discharging as described above is performed, in a region where the scanning discharging is initiated without occurrence of discharging in a surrounding area, discharging is unstable.

As shown in FIG. 28, an auxiliary discharging region being adjacent to a region in which scanning light emission starts and in which discharging is maintained continuously or immediately before initiation of scanning light emission, is formed outside of the displaying region by the auxiliary discharging electrode 104.

These electrodes can be fabricated by using same processes as used for fabricating the common electrode 102 or the scanning electrode 202. By the auxiliary discharging, an ion, electron or excited atoms or molecules can be supplied to a region in which scanning light emission is initiated and a state of initiation of the scanning discharging can be stabilized.

Moreover, in the auxiliary discharging electrode 104, it is preferable that the discharging light emission is inhibited by making small an area of the auxiliary discharging electrode 104 and by making large a thickness of its dielectric material layer in a range in which discharging is stable. To prevent light for auxiliary discharging from leaking into the displaying region, a light intercepting section 105 is formed on a side of the displaying face in the auxiliary discharging region (see FIG. 28).

Also, in order to prevent light for the auxiliary discharging from being converted to visible light, as shown in FIG. 29, no placement of the fluorescent material in a region in which auxiliary discharging electrodes 104 are arranged is an effective idea.

Furthermore, as shown in FIG. 30, formation of the (auxiliary discharging intercepting) partition wall 106 used to separate the auxiliary discharging region from the scanning discharging region within a range in which an effect by the auxiliary discharging is reduced more than necessary is also effective in preventing light for the auxiliary discharging from being converted to visible light.

A voltage being applied to the auxiliary discharging region may be same as in the scanning discharging region and another driving circuit may be provided.

In the case of using the other driving circuit, although costs required for using the driving-circuit has risen, intensity of auxiliary discharging can be independently controlled and both a displaying function and a driving function can be easily optimized.

Next, in order to more improve characteristics of backlight scanning light emission, as shown in FIG. 31, a scanning electrode 202 of the discharging-type backlight is placed outside the displaying region of the liquid crystal displaying section 1 and by synchronizing scanning timing for the liquid crystal displaying section 1 with scanning timing for the backlight, scanning is performed approximately at a same speed.

In the discharging-type backlight, in some cases, light emission at a discharging end is different in uniformity from the light emission at a central portion or is dispersed in uniformity. By providing redundancy to a scanning light emission region of the backlight, high reliability can be given to a displaying characteristic of the liquid crystal display panel performing a scanning driving using the backlight, that is, the scanning-type backlight.

It is clear that characteristics of light emission and scanning driving become better by using the auxiliary discharging in combination.

Next, another example of the discharging-type backlight that can emit light providing three primary colors (R, G, and B) is described.

In the example, at least one of either the common electrode or the scanning electrode corresponds to a region in which any one of colors out of the three primary colors ROB appears.

For example, the scanning electrode is formed on the rear substrate in a short-book form and a strip-shaped partition wall having a height of 100 μm to several millimeters is formed in a manner that a region including the (short-book shaped) electrode is partitioned. On an inside wall face of this partition wall is formed a white dielectric layer and are stacked RGB color changing fluorescent material layers in order.

After the white dielectric material layer has been formed in a manner that it covers an entire discharging displaying region of the short-book shaped scanning electrode, the strip-shaped partition wall and the RGB color changing fluorescent material layers may be formed. A RGB color scanning-type backlight is fabricated by manufacturing the front substrate having the common electrode in the way described above and by bonding the front substrate to the rear substrate.

A rectangular waveform voltage or sine waveform voltage having several kHz to several tens MHz are applied to the common electrode and a voltage is applied to the scanning electrode in a manner that light emission occurs in a region for each of RGB colors and scanning is performed.

A state in which the RGB color light emission region is discontinuous can be controlled by an expanding plate and scanning can be performed individually on the uniform RGB color light emission region. By operating as above, a liquid crystal panel having a high aperture rate and a high light using rate can be obtained without using a color filter. Since the high light using rate can be obtained, it is possible to improve luminance of emitted light and to reduce power consumption.

In the above example, the discharging-type backlight operated by using discharge in a gas is explained, however, as the backlight, for example, a field-emission-type backlight in which electrons are accelerated in a vacuum and the accelerated electrons is injected into a fluorescent material or an organic electroluminescence-type backlight operated by using electro-luminescent light may be employed.

It is apparent that the present invention is not limited to the above embodiments but may be changed and modified without departing from the scope and spirit of the invention.

What is claimed is:

1. A device, comprising:
a liquid crystal display section comprising a first screen; and
a backlight section comprising a plurality of light emitting layers including respective colors;
wherein
the liquid crystal display section is configured to perform a single full scan of the first screen of the liquid crystal display section during a cycle, and
the backlight section is configured to perform, during the cycle and subsequent to the single full scan, a first scan of a first subset of the plurality of light emitting layers corresponding to a first of the colors.

2. The device of claim 1, further comprising an anti-electro-magnetic interference filter layer formed internally to the liquid crystal displaying section.

3. The device of claim 2, wherein the anti-electro-magnetic interference filter layer comprises a mesh-shaped conductor embodied as a film within the liquid crystal display section.

4. The device of claim 1, wherein the backlight section is further configured to generate light via discharge in a gas.

5. The device of claim 1, wherein a gas is filled in the backlight section in a hermetic manner, and wherein light generated by the backlight section is fluorescent light emitted from a fluorescent material excited by excitation light generated by discharge in the gas.

6. The device of claim 1, further comprising a fluorescent layer mounted on a front face of the liquid crystal display section.

7. The device of claim 1, wherein the backlight section comprises a scanning electrode configured to scan an electron source.

8. The device of claim 7, wherein an electron fed from the electron source is guided into a fluorescent layer, and wherein the light fed from the backlight section is produced by acceleration of electrons under a vacuum and injection of the electrons into the fluorescent layer.

9. The device of claim 1, wherein the backlight section is provided with an electroluminescent device and the light fed from the backlight section is electroluminescent light.

10. The device of claim 1, wherein the backlight section comprises a backlight face, and wherein the plurality of light emitting layers are spatially separated from each other on the backlight face.

11. The device of claim 1, wherein the backlight section comprises a backlight face, and the plurality of light emitting layers comprise multiple light emitting layer groups, wherein the plurality of light emitting layers are spatially separated from each other on the backlight face.

12. The device of claim 11, wherein the multiple light emitting layer groups are respectively scanned as a scanning unit.

13. The device of claim 1, further comprising an anti-electro-magnetic interference filter layer mounted between the liquid crystal display section and the backlight section.

14. The device of claim 1, wherein the first screen of the liquid crystal display section is configured to be scanned once during a period in which a second screen of the backlight section is configured to be scanned two or more times.

15. The device of claim 1, wherein the backlight section is further configured to perform, during the cycle and subsequent to the first scan, a second scan of a second subset of the plurality of light emitting layers corresponding to a second of the colors.

16. A device, comprising:
a liquid crystal display section comprising a screen; and
a backlight section comprising a plurality of light emitting layers including respective colors;
wherein the backlight section is configured to, prior to a full scan of the screen of the liquid crystal display section, perform a first scan of a first subset of the light emitting layers corresponding to a first of the respective colors.

17. The device of claim 16, wherein light supplied by the backlight section is generated by discharge in a gas.

18. The device of claim 16, wherein a gas is filled in the backlight section in a hermetic manner, and wherein light supplied by the backlight section is fluorescent light emitted from a fluorescent material excited by excitation light generated by discharge in the gas.

19. The device of claim 16, further comprising a fluorescent layer mounted on a front face of the liquid crystal display section.

20. The device of claim 16, wherein the backlight section is maintained under a vacuum and comprises a scanning electrode configured to scan an electron source.

21. The device of claim 20, further comprising a fluorescent layer, wherein an electron fed from the electron source is guided into the fluorescent layer, and wherein light supplied by the backlight section is produced by acceleration of electrons under the vacuum and injection of the electrons into the fluorescent layer.

22. The device of claim 16, wherein the backlight section comprises an electroluminescent device, and light supplied by the backlight section is electroluminescent light.

23. The device of claim 16, wherein the backlight section comprises a backlight face, and wherein the plurality of light emitting layers are spatially separated from each other on the backlight face.

24. The device of claim 23, wherein the colors are independently scanned.

25. The device of claim 16, wherein the backlight section comprises a backlight face, the plurality of light emitting layers comprise multiple light emitting layer groups, and the plurality of light emitting layers are spatially separated from each other on the backlight face.

26. The device of claim 25, wherein the multiple light emitting layer groups are respectively scanned as a scanning unit.

27. The device of claim 16, further comprising an anti-electro-magnetic interference filter layer disposed between the liquid crystal display section and the backlight section.

28. The device of claim 27, further comprising a light diffusing layer configured to diffuse light fed through the anti-electro-magnetic interference filter layer from the backlight section.

29. The device of claim 28, wherein the light diffusing layer is disposed between the anti-electro-magnetic interference filter layer and the liquid crystal display section.

30. The device of claim 16, wherein the backlight section is further configured to, prior to the full scan of the screen of the liquid crystal display section, perform a second scan of a second subset of the light emitting layers corresponding to a second of the respective colors, wherein the second scan is performed subsequent to the first scan.

31. A method, comprising:
supplying light to a liquid crystal display section from a backlight section comprising multiple light emitting layers;
scanning a first subset of the light emitting layers corresponding to a first color during a first period of a cycle; and
scanning a screen of the liquid crystal display during a second period of the cycle subsequent to the first period, wherein the screen of the liquid crystal display is fully scanned once during the second period.

32. The method of claim 31, further comprising filtering electro-magnetic interference between the liquid crystal display section and the backlight section.

33. The method of claim 32, wherein the filtering the electro-magnetic interference comprises filtering with an anti-electro-magnetic interference filter layer formed internally to the liquid crystal display section.

34. The method of claim 31, further comprising scanning a second subset of the light emitting layers corresponding to a second color subsequent to the scanning the first subset during a third period of the cycle, wherein the third period is subsequent to the first period and prior to the second period.

35. A system, comprising:
means for performing a full scan of a screen of a liquid crystal display section once during a period; and
means for first scanning, during the period and in response to completion of full scan of the screen, a first set of light emitting layers of a backlight section that provides light to the liquid crystal display section, wherein the first set of light emitting layers corresponds to a first color.

36. The system of claim 35, further comprising:
means for filtering electro-magnetic interference between the liquid crystal display section and the backlight section.

37. The system of claim 35, further comprising means for second scanning, during the period and in response to completion of the first scanning, a second set of light emitting layers of the backlight section corresponding to a second color.

* * * * *